US008083557B2

(12) United States Patent
Sullivan

(10) Patent No.: US 8,083,557 B2
(45) Date of Patent: Dec. 27, 2011

(54) METHOD AND APPARATUS FOR POWERING OF AMPHIBIOUS CRAFT

(76) Inventor: Steven Sullivan, Reston, VA (US)

( * ) Notice: Subject to any disclaimer, the term of this patent is extended or adjusted under 35 U.S.C. 154(b) by 342 days.

(21) Appl. No.: 12/357,153

(22) Filed: Jan. 21, 2009

(65) Prior Publication Data
US 2009/0186535 A1 Jul. 23, 2009

Related U.S. Application Data

(60) Provisional application No. 61/021,970, filed on Jan. 18, 2008.

(51) Int. Cl.
*B63H 21/17* (2006.01)
(52) U.S. Cl. .............. 440/6; 290/54; 440/12.66; 440/38
(58) Field of Classification Search ............. 440/6, 12.5, 440/12.53, 12.57, 12.66, 38; 290/54
See application file for complete search history.

(56) References Cited

U.S. PATENT DOCUMENTS
5,755,602 A * 5/1998 Klukowski ...................... 440/38
* cited by examiner

*Primary Examiner* — Lars A Olson
(74) *Attorney, Agent, or Firm* — Hyra IP, PLC; Clifford D. Hyra

(57) ABSTRACT

The methods and apparatuses of the present invention provides for powering and maneuvering (forward, reverse and steering) systems for amphibious vehicle, marine vessel or ground vehicle operation and control. An improved propulsion system may incorporate the use of electric motors combined with impellers which use positive and negative magnetic torque applications and allows for new control strategies when used in water or on the ground. More precise control of the motoring and steering forces is provided which is suitable for use in a variety of amphibious, marine vessels or ground vehicle applications. Various types of electric drive motor/generators may be incorporated for use therein. Intelligent motion control systems may provide for improved vehicle control that can provide motive force and braking force in a precisely controlled manner that significantly improves performance and has faster control dynamics incorporating a fully integrated electrical braking and maneuvering system.

26 Claims, 7 Drawing Sheets

METHOD AND APPARATUS FOR POWERING OF AMPHIBIOUS CRAFT

This is a non-provisional patent application claiming priority to U.S. Provisional Patent Application No. 61/021,970 filed Jan. 18, 2008, the entire disclosure of which is incorporated herein by reference. In addition, the entire disclosure of U.S. patent application Ser. No. 11/924,653 filed Oct. 26, 2007 is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to powering and maneuvering (forward, reverse and steering) systems for amphibious vehicles, marine vessel operation or ground vehicle operation and control, and more specifically to an improved propulsion system that incorporates the use of electric motors combined with impellers which use positive and negative magnetic torque applications and allows for new control strategies when in water or on the ground (ground vehicle use) by more precisely controlling the motoring and braking forces which is suitable for use in a variety of amphibious craft, marine vessels or ground vehicle applications which incorporates various types of electric drive motor/generators for use therein that are optimized for peek efficiency and control at various operational speeds.

BACKGROUND OF THE INVENTION

It is known in the field of amphibious vehicle operation and control to be provided with marine jet drive or impeller pods for vehicle assemblies such as in U.S. patent applications 2004/0014371, 2006/0172627 and 2007/0145751 also as in U.S. Pat. Nos. 7,241,193, 7,214,112, 6,971,931, 6,808,430, 6,364,725, 6,045,418, and 5,421,753 which includes an inlet a pumping means and an outlet nozzle.

Electric Jet drives such as described within pending application publication number 2007/0145751 substitute an external drive motor with an integrated electric drive that lacks control as to dynamic nozzle sizing or geometry with the associated electrical input power. These drives lack control of efficiency over the operational envelop of various vehicle speeds; thus, limiting the usefulness and utility of jet drives within various types of marine vessels including amphibious craft.

Electric Jet drives such as described within U.S. Pat. Nos. 7,241,193, 5,658,306, 5,679,035 and 5,683,276 disclose control systems for control of inlet duct, vane control of the impeller pitch and outlet nozzle sizing that relate to shaft rpm, head pressure and pump affinity constants to compute system flow for a derived power requirement of the pump that does not take into account the real applied power and that lacks control as to dynamic nozzle sizing or geometry with the associated real input power; thus, limiting the usefulness and utility of monitoring true efficiency of jet drives within various types of marine vessels including amphibious craft due to the control system estimation errors, and the associated complexity and reliability problems of variable-pitch impeller blades.

Current amphibious vehicle control systems incorporate the use of ground based wheel drive systems and separate jet drive or pod drive systems for operating within the water wherein said drive systems consist of a non-rotatable drive shaft support structures and bearings with an impeller for rotation attached to a drive shaft coupled to a motor used to convert the rotational energy of the motor into fluid flow energy which introduces added weight due to the separate components of the marine drive and ground drive system; thus, increasing the weight and number of parts and limiting its utility.

A major disadvantage with the use of jet propulsion units is the necessity for a complicated drive train between the engine of the vehicle and the jet propulsion unit. An amphibious vehicle that employs a jet propulsion unit typically would include a gearbox coupled to the engine, a drive shaft coupled to the gearbox at one end and at the other end to the jet propulsion unit. The connections at each end of the drive shaft are of the flexible coupling type and the overall arrangement is generally cumbersome to install and maintain, as well as being expensive and bulky. The maintenance of the drive train requires the sourcing of replacement parts which increases parts inventory cost and complicates maintenance procedures.

A further disadvantage is that these jet propulsion arrangements encroach significantly further into the interior of a vehicle, when compared to similar horsepower in wheel or electric drive arrangements.

Various amphibious and marine jet drive and pod drive system configurations, and methods are referenced herein, and the entire teachings of which and their references sited therein are expressly incorporated by reference herein.

Such amphibious and marine jet drive control systems as previously described possess significant added weight that detract from their overall utility or lack efficiency over the entire operational envelop, as a result of said system configurations and/or lack of control methods; thus, affecting the performance and implementation capabilities of the referenced related art amphibious, marine and ground drive systems. Consequently, there is a need for improved amphibious, marine and ground drive and motion control system configurations that overcome the aforementioned and other disadvantages. Additional disadvantages of other amphibious and marine drive control systems include the lack of information related to applied torque values and the exit nozzle dynamics related to the applied torque values.

SUMMARY OF THE INVENTION

Some of the embodiments of the presently disclosed marine propulsion system for wheeled amphibious craft having an in wheel electric motor/generator include a jet propulsion unit having an inlet for fluid flow, adaptive (variable and steerable) outlet nozzles through which fluid discharge is controlled as to direction and as to size for the purpose of maximizing at least one of thrust and efficiency based upon measured true input power, a fluid flow path to direct the fluid flow between the inlet and the outlet, and at least one impeller disposed within fluid flow path to impart energy into the fluid from an electrical power source provided to the in wheel electric motor/generator wherein the impeller is operably coupled to the in wheel electric motor/generator of the wheeled amphibious craft wherein the wheel hub of the in wheel electric motor/generator is an impeller structure and the stator vanes are operably coupled to the stator of the in wheel electric motor/generator, a fluid flow defining channel which accommodates the in wheel electric motor/generator with a wheel hub impeller arrangement.

For certain embodiments, the in wheel electric motor/generator may include at least one rotor section and at least one stator section arranged such that a gap exists between the rotor and stator sections or members. The rotor member may be operably coupled to a wheel of the wheeled amphibious craft for rotation. The stator member may be operably coupled to an axle or torque tube of the wheel for non-rotational support. The rotor section may comprise of a permanent magnet structure with an associated magnetic flux field and the stator section may comprise of current carrying conductors. For some embodiment, a stator section may be operably coupled to an amphibious craft. Further, a wheel may be operably coupled to an impeller and rotatable with respect to the stator section about a rotational axis. The stator and rotor sections of the in wheel electric motor/generator may be configured such that the interaction of their magnetic fluxes causes at least one of: (a) the conversion of electrical energy into rotational torque energy when electrical power is applied in controlled directions, sequences, and power levels at the input terminals of the current carrying conductors such as to create an associated magnetic flux field within the current carrying conductors that interacts with the rotor magnetic flux field thus applying magnetic torque to the rotor of the wheel; and (b) the conversion of rotational torque energy of the wheel into electrical energy when relative motion exist between the permanent magnets within the rotor and the current carrying conductors within the stator electrical power is generated at the terminals of the current carrying conductors such as to create an associated magnetic flux field within the current carrying conductors that interacts with the rotor magnetic flux field thus applying magnetic counter torque to the rotor.

Another embodiment of a propulsion system for wheeled amphibious craft having an in wheel electric motor/generator may include a control system through which vehicle maneuvering is controlled as to direction and as to maximizing at least one of torque applied and efficiency, a torque controller to direct the torque to each individual wheel from an electrical power source provided to the in wheel electric motor/generator. In some embodiments, the wheel is operably coupled to the wheeled amphibious craft.

For certain embodiments, the in wheel electric motor/generator includes at least one rotor section and at least one stator section arranged such that a gap exists between the rotor and stator sections or members. The rotor member may be operably coupled to a wheel of the wheeled amphibious craft for rotation. The stator member may be operably coupled to an axle or torque tube of the wheel for non-rotational support. For some embodiments, a stator section is operably coupled to an amphibious craft. Further, a wheel operably may be coupled to an impeller and rotatable with respect to the stator section about a rotational axis. The stator and rotor sections of the in wheel electric motor/generator may be configured such that the interaction of their magnetic fluxes causes at least one of: (a) the conversion of electrical energy into rotational torque energy when electrical power is applied in controlled directions, sequences, and power levels at the input terminals of the current carrying conductors such as to create an associated magnetic flux field within the current carrying conductors that interacts with the rotor magnetic flux field thus applying magnetic torque to the rotor of the wheel; and (b) the conversion of rotational torque energy of the wheel into electrical energy when relative motion exist between the permanent magnets within the rotor and the current carrying conductors within the stator electrical power is generated at the terminals of the current carrying conductors such as to create an associated magnetic flux field within the current carrying conductors that interacts with the rotor magnetic flux field thus applying magnetic counter torque to the rotor.

Another embodiment of a marine propulsion system for water craft having an electric motor/generator may include a jet propulsion unit having an inlet for fluid flow, adaptive (variable and steerable) outlet nozzles through which fluid discharge is controlled as to direction and as to size for the purpose of maximizing at least one of thrust and efficiency based upon measured true input power, a fluid flow path to direct the fluid flow between the inlet and the outlet and at least one impeller disposed within fluid flow path to impart energy into the fluid from an electrical power source. The impeller may be operably coupled to the electric motor/generator. Further, the stator vanes may be operably coupled to the stator of the electric motor/generator. Some embodiment may have a fluid flow defining channel which accommodates the electric motor/generator impeller arrangement.

For certain embodiments, the electric motor/generator includes at least one rotor section and at least one stator section arranged such that a gap exists between the rotor and stator sections or members, wherein the rotor member is operably coupled to an impeller for rotation and the stator member is operably coupled to the fluid flow channel for non-rotational support. For some embodiments, a stator section may be operably coupled to a fluid flow defining channel of a marine craft. Also, a rotor section may be operably coupled to an impeller and rotatable with respect to the stator section about a rotational axis. The stator and rotor sections of the electric motor/generator may be configured such that the interaction of their magnetic fluxes causes at least one of: (a) the conversion of electrical energy into rotational torque energy when electrical power is applied in controlled directions, sequences, and power levels at the input terminals of the current carrying conductors such as to create an associated magnetic flux field within the current carrying conductors that interacts with the rotor magnetic flux field thus applying magnetic torque to the rotor of the impeller; and (b) the conversion of rotational torque energy of the impeller into electrical energy when relative motion exist between the permanent magnets within the rotor and the current carrying conductors within the stator electrical power is generated at the terminals of the current carrying conductors such as to create an associated magnetic flux field within the current carrying conductors that interacts with the rotor magnetic flux field thus applying magnetic counter torque to the rotor.

Another embodiment of marine propulsion system for wheeled amphibious craft having an in wheel electric motor/generator may including a radial wheel hub impeller propulsion unit that is partially submerged within the water or fluid to impart energy into the fluid, which is operably coupled to an in wheel electric motor/generator wherein. In some embodiments, the wheel hub may be partially submerged underwater so as to interact with the fluid such as to cause motive force to be applied by the rotating wheel to the amphibious craft.

For certain embodiments, the in wheel electric motor/generator includes at least one rotor section and at least one stator section arranged such that a gap exists between the rotor and stator sections or members, wherein the rotor member is operably coupled to a wheel of the wheeled amphibious craft for rotation and the stator member is operably coupled to an axle or torque tube of the wheel for non-rotational support. In some embodiments, a stator section may be operably coupled to an amphibious craft. A wheel may be operably coupled to an impeller and rotatable with respect to the stator section about a rotational axis. The stator and rotor sections of the in wheel electric motor/generator may be configured such that the interaction of their magnetic fluxes causes at least one of: (a) the conversion of electrical energy into rotational torque energy when electrical power is applied in controlled directions, sequences, and power levels at the input terminals of the current carrying conductors such as to create an associated magnetic flux field within the current carrying conductors that interacts with the rotor magnetic flux field thus applying magnetic torque to the rotor of the wheel; and (b) the conversion of rotational torque energy of the wheel into electrical energy when relative motion exist between the permanent magnets within the rotor and the current carrying conductors within the stator electrical power is generated at the terminals of the current carrying conductors such as to create an associated magnetic flux field within the current carrying conductors that interacts with the rotor magnetic flux field thus applying magnetic counter torque to the rotor.

In any of the above disclosed embodiments, a variety of structural alloy metals or other materials such materials may include, but are not limited to, copper, nickel, aluminum, bronze, stainless steel, titanium, carbides, and complex alloys of the metals or composites and hybrid composites with reinforcement materials such as E, S or R-glass, carbon and carbon fiber and carbon nanofibers that can be combined and woven in 2 and/or 3 dimensional woven materials that are further molded into matrix resins such as polyester, vinyl ester, phenolic, epoxy polymers and/or monomers or Ultra-High Molecular Weight Polyethylene (UHMWPE), polyethylene-polyethylene oxide blends that may be combined with metal catalyst and plasticizer to match the wide variety of operating environments and design parameters in which they are used wherein the composites that are selected from materials of; Teflon, carbon fiber, carbon nanofiber, nanoparticles, glass nanofiber, glass or Aramid fiber can be used for the structural materials and the composite hybrids that are made by the addition of some complementary material such as, graphene, fiberglass and/or Kevlar to the carbon fiber/epoxy matrix such as S-glass/Kevlar/carbon wherein the added materials are used to obtain specific material characteristics such as greater fracture toughness and impact resistance considered for areas subject to possible foreign object damage wherein the addition of graphene, carbon/epoxy to composite and hybrid composite structures is used to provide additional stiffness also carbon-carbon matrix structures can also be used wherein the above materials can be combined within various combinations to achieve various material objectives such as hardness and toughness as needed.

In some embodiments, the permanent magnet structure is segmented into altering poles of north and south poles interacting with the current carrying conductors that are constructed of coils and controlled by an electrical control system such that the stator coils are associated with the same number of rotor poles and wherein the coils of the stator section are sized such the stator coils are similarly sized with that of the associated permanent magnets within the rotor.

In some of the embodiments, the permanent magnet structure is constructed of homopolar magnets with a north and/or south pole interacting with the current carrying conductors which is composed of electrically conductive material that is arranged such as to create at least one of, motor action and generator action by interacting with the rotor permanent magnet flux field wherein the supplied electrical power is from an electrical power source through an electrical control system such that the electrically conductive material is supplied with direct current power and controlled as to power level, direction and duration via electrical connections and electrical control system such as to accomplish at least one of, motor action and generator action.

In some embodiment, the electrical control system may be an inverter controlling the supplied multiple phase pulse width modulated voltage from a DC power source or bus to the stator coils; and a controller for control of the inverter applied active currents wherein the controller includes rotational velocity based on rotor position and rate of change in position, the controller controlling a duty cycle (duration of the on state) of the multiple phase pulse width modulated voltage modulating the duty cycle (calculating a velocity difference between the detected rotor velocity and a target rotor velocity), such as to minimize the difference between a target value of rotor velocity and the detected rotor velocity wherein the controller modifies the duty cycle of the controller to minimized the difference between a target rotor velocity value and actual rotor velocity.

In certain of these embodiments, the system further comprises hall sensors precisely positioned within the stator section and are use to sense the direction of rotation, position and velocity of the rotor magnets in relationship with associated stator coil windings such as to properly time the application of currents to the stator coil windings and for tracking the applied active currents and to provide for velocity and directional information to the control system for the purpose of generating magnetic torque applications to produce motor action. In other of these embodiments, the system further comprises a sensorless control system using voltage from back emf within the stator coils to determine direction of rotation, position and velocity of the rotor magnets in relationship with associated stator coil windings such as to properly time the application of currents to the stator coil windings and to provide for positional, velocity and directional information to the control system for the purpose of generating magnetic torque applications to produce motor action. In those embodiments, the target velocity of the rotor is such that the rotational velocity of the associated wheel tire is made to closely match the relative ground speed of the associated aircraft thus the aircraft landing gear wheels starting out in a rolling friction state.

In some embodiments, the stator and rotor member is comprised of a axial flux design wherein electrical connections to an electrical source are provided for via an electronic switching and control system such that each stator coil may generate an individual axial magnetic flux field such as to interact with the associated axial magnetic flux field of the permanent magnets within the rotor to create motor action. For some embodiments, the stator and rotor member is comprised of a radial flux design wherein electrical connections to an electrical energy source are provided for via an electronic switching and control system such that each tube conductor may generate an individual radial magnetic flux field such as to interact with the associated radial magnetic flux field of the permanent magnets within the rotor to create motor action. In some embodiments, the method of motorized braking is accomplished by applying electrical power to a stator member coil or coils in such a manner as to apply a braking effect by motoring the associated rotor member or members such as to oppose the rotor's rotational direction.

For some embodiments, the generated electrical power is supplied to an electrical power storage device through an electrical control system such that the stator coil windings supply a varying number of alternating current power levels with various electrical phases via electrical connections and electrical control system such as to accomplish generator action. In other embodiments, the generated electrical power is supplied to an electrical power storage device through an electrical control system such that the electrically conductive material supplies direct current power and controlled as to power level, direction and duration via electrical connections and electrical control system such as to accomplish generator action. The generated electrical output power may be dissipated within an energy dissipation device through a control system such that the stator coil windings supply an output power signal that is applied to the energy dissipation device.

In certain embodiments, the energy dissipation device consist of induction heating wherein heating of an object is accomplished by electromagnetic induction, where eddy currents are generated within the object of conductive material and the associated resistance leads to Joule heating of the object wherein induction heating consists of an altering electromagnetic flux field generated by an alternating current (AC) as it is passed through a coil and an associated object which has eddy currents introduced due to time rate of change of electromagnetic flux field thus generating heating of the object. The energy dissipation device may include a dissipation resistor or resistors for the purpose of converting the electrical power into heat energy. The dissipation resistor may include heat-generating material within a sealed thermal heat sink enclosure and a phase change material within the sealed thermal heat sink that is in thermal contact with the heat-generating material.

In some embodiments, an AFPM implementation of a Halbach-type magnet array is constructed such that constructed poles and the permanent magnets rotate and are arranged to produce a uniform axial flux distribution on the interior or exterior of the magnetic member to increase the magnetic flux density interacting with the current carrying conductors to further increase energy density of the motor/generator. In some embodiments, an RFPM implementation of a Halbach-type magnet array is constructed such that constructed poles of the permanent magnets are in a circular geometrical configuration or cylindrical Halbach array to increase the magnetic flux density interacting with the current carrying conductors to further increase energy density of the motor/generator.

In some embodiments, an intelligent control system that includes: a vehicle driven by drive by wire or drive by wireless systems incorporating the use of electric in wheel motor/generators provides for unique advantages over the prior art intelligent control systems wherein vehicle control systems that drive and brake each wheel independently wherein the applied torque to the in wheel motor/generator is known precisely not estimated and the control dynamics is extremely fast; thus, allowing for unprecedented intelligent motion controls of a vehicle. In some embodiments, the intelligent control systems may be integrated together such as Automatic Braking Control, Anti-lock Braking Systems (ABS), Traction Control Systems (TCS), Electronic Stability Control (ESC), and Automated Collision Avoidance Systems (ACAS) referenced into a combined functioning control system. The significant advantages of such a system are due to the fact that the motor/generators can achieve either acceleration or deceleration torques applied to various wheels in various directions and combinations; thus, allowing for the safe and effective design of new control systems that provide increased levels of control, comfort, and durability. Each wheel with an in wheel motor/generator may generate positive or negative torque values on the left and/or right wheels, and/or front and/or rear wheels in various combinations to enhance vehicle steering control capability incorporating a permanent magnet DC motor or servo that is coupled to the steering column and is used with the steer by wire steering unit to provide steering control through a Pulse Width Modulated (PWM) interface, increase stability and control. Such vehicle steering maneuvers consist of all-wheel steering (front steering and/or rear steering) that can be initiated automatically, by operator input or automatically assist the operator. Such maneuvers allow for increased levels of safety in operation and for accident prevention. Such a steering system would incorporate high speed and low speed steering modes. The angular movement and positioning control of each wheel is achieved by means of an articulated moveable linkage that is electromagnetically actuated. The steering may be assisted from differential motoring and/or braking of each wheel thus allows for effective active safety devices to perform at levels not available to current state of the art active safety control systems due to the control dynamics of the in wheel motor/generators being fast, precise, and accurate.

In some embodiments, the intelligent control system engine may contain any of the following: Conditions, Actions, State Items, Monitoring Interface, and Filters. Conditions can be used in many parts of rules based control system and can control rule execution and situation detection depending on the context in which the conditions are used such as weather condition, contact surface condition, tire condition, and other number of parameters can be accessed in the condition evaluation process and the state items can be accessed from a condition in every context. State items are global and does not belong to any particular rule or rule instance thus within every place where a condition can be used its result can depend on the existence of a state item and after a situation is detected there is an option to evaluate the condition. The condition can access all the parameters of the events that took part in the situation detection within the goals context of the control system. There are two different kinds of Actions that can take part as the last step in the execution of a rule instance; One is a positive action, executed when a situation is detected and the other is a negative action executed if a situation is not detected. The action of a rule is executed if the condition is true, if the rule has the condition part activated and without an enabled condition part the actions are executed directly after the situation detection process decides that a situation is detected or that it can not be detected at all thus the action of a rule can consist of several action items that should be executed. The Action items supported are executing scripts, creating an event or creating or deleting state items. The action is the mechanism through which intelligent control system can inform external applications that a rule has triggered and an action item executing a script could for example write data into an applications database indicating a rule triggering. The State Item in intelligent control system is used to model any kind of activity that have a duration and by definition, an event happens in a specific point in time while a state is created at one point of time and deleted at a later point in time thus the state management feature gives intelligent control system the capability to detect situations that are of interest only when a specific state is active. The state could for example be used to model "operating hours" or "last service interval" or any other period of time and by using a reference to a state item in a condition evaluation it is possible to suppress a rule or control the detection of a situation depending if a specific state item exists. A rule for the detection of a disturbance could be disabled during parking or docked status of vehicle and only be active during operation of the vehicle. The state items can also be used to control the situation detection process in many ways such as to delay the reporting of a detected situation if a particular state exists and coupled to each rule there is a filter. The filter evaluates an event before an event reaches the rule thus the filter may decide to drop any event based on event contents (spurious content) or if a state item exists or not (verification of systems status and functional state). The filter may also decide to drop any events sent to a rule, due to noise or outside safety envelop of operation thus the filters are an efficient method to disable a rule during periods of time that they are not required or wanted based on design criteria for the vehicle control dynamic states and the Monitoring Interface of the intelligent control system Engine provides an easy access to data about rule definitions and rule instances wherein the monitoring interface provides a real time snapshot of the internal state of the intelligent control system Engine and the monitoring interface is implemented through a computer controller that publishes monitoring with a number of functions wherein the functions can be used to fetch data about rule instance, rule definitions, situation detectors, action items, condition evaluators and event history which provides run-time status information about the intelligent control system Engine. The Condition part of the rule is a Boolean expression and is evaluated after the situation of the rule is detected thus the condition expression can refer to the parameters of the events that took part in the situation detection thus by defining a condition to a rule you can make sure that a certain condition is valid after the situation is detected. The situation of a rule is detected, the condition is evaluated and if the condition is true, the rule's action is executed and thus the action is the way you will know that a rule has fired and an action can execute an application, create or delete a state or create a new event. The event can also be sent back to the input queue of the intelligent control system Engine creating a control loop.

In some embodiments, Traction Control Systems (TCS) may be applied to the in wheel hub motor/generators to be actively controlled by the motor controller at anytime with extremely fast control dynamics. The motor controller may be used to influence any aspect of a vehicle's performance, including motoring, braking, steering and cornering. Control of wheel traction influences motoring, braking, steering and cornering accomplished by a comprehensive Traction Control System (TCS) system and requires sensors and control systems with complex control algorithms generated by controls systems engineers to design and program Traction Control System (TCS) computers within the intelligent motion controls of the vehicle desired behavior for any situation with the ability to apply advances in mathematics and intelligent controls taking advantage of the fast control dynamics available when incorporating in wheel hub motor/generators for the purpose of maneuvering and braking controls for a vehicle of any type that would benefit from such advantages in precision, accuracy and speed of control dynamics. Sensors on the vehicle will tell the TCS computer what the vehicle's behavior actually is at any point in time and the computer will then use mathematical models of the in wheel hub motor/generator and vehicle dynamics to determine what actions should be taken to make actual vehicle behavior most closely match desired vehicle behavior. Closed loop feedback can be used to fine tune any algorithms used while the vehicle is being operated. Such loop feedback may include feedforward to account for gradual disturbances such as changes in terrain influences and the mathematical in wheel hub motor/generator model is used to predict the required application of positive or negative torque, and electrical power required to produce a desired torque at each individual wheel. This model would include motor torque for any RPM, temperature, tire air pressure, loading, terrain etc. This torque can be negative (braking torque) or positive (motoring torque). The model would also include things like in wheel hub motor/generator rotational inertia, wheel drag, effective rolling radius, wheel slip, slip angle, steering, braking power, motoring power, vehicle velocity and angular position, and tire torsion stiffness. The mathematical vehicle dynamics model is needed to predict the wheel torque required to produce a desired behavior on the contact surface. Such a model would include the center of gravity (CG), torsion forces acting upon the CG, aerodynamic forces, masses, moments of inertia, tire information, and suspension positions and be able to predict the impact and affects of the changes in dynamics to the control capability and limits of system control capability. The vehicle dynamics model would be improved with variable contact surface mapping including bumps, hills, corners, turns, banks and other contact surface influences that cause changes in the contact patch geometry and the associated effects on vehicle behavior. The intention of the model is to develop dynamic expressions for control algorithms to be used later on for control purposes and to derive the coefficient of tire-road friction or coefficient of adhesion as a function of the vehicle dynamics. The models allow the Traction Control System (TCS) to alter the current behavior to desired behavior. Desired behavior is limited within the confines of a safe operation envelop. Control inputs from the operator operate within the envelop of safety confines that are defined by the control system rules and during normal braking input commands from the operator are such that regenerative braking is applied and during hard or emergency braking the vehicle will effectively have active motorized braking control. Regenerative braking controls are removed from the braking control system. Motorized braking is applied to the individual in wheel hub motor/generators such that a negative torque is applied to the individual wheels to provide for more effective braking power than regenerative braking could apply and if there is too much brake force applied to the in wheel hub motor/generator then the ABS can alter the applied torque to each individual such as to optimize the applied torque according to a defined slip value that maximizes the braking force while maintaining maximum steering control capability and the operator of the vehicle will have quicker braking capability and less concern of locking the wheels, for example locking of the rear wheels and spinning going into a turn or in a steady state corner, if vehicle operator responds to oversteer by decreasing the application to the accelerator peddle. Such operator action to oversteer can make the situation worse. The TCS can use information from the vehicle dynamics model to predict how quickly the application of positive torque (motoring torque) can be rolled off without making the oversteer worse. The TCS can then override the operator input until it determines that the vehicle would be stable again under operator control such TCS can also sense or predict oversteer on its own and gently roll off the applied positive torque without any input from the driver and during acceleration TCS operation is such that when a tire circumferential velocity matches vehicle velocity by definition there is zero slip and thus no forward force applied to the tire, so the tire will slip slightly to accelerate the vehicle. The acceleration increases with slip until it peaks at an optimum value which can be determined by the calculated slip and then acceleration decreases with additional slip beyond this peek value of slip thus we want the control system to operate at the peek of the curve for optimum performance capability. Complex combinations of braking, cornering, and acceleration have to be considered in order to maximize performance in these instances and influence the vehicle so that the vehicle operator has confidence the vehicle will respond to operator input control in a safe and controllable manner thus achieving fast and accurate responses with minimal tracking error. Such controllers are further optimized over time by learning via adaptive feedback/feedforward controller architectures and/or symbolic machine learning and/or artificial intelligent, Brain Based Devices thus automatically building the rules based reactions for separate designated control task reducing the development time in establishing the limits or boundaries and rules for the various system and sub-system controllers. Such adaptive learning alters the weighting of variables as the various systems and sub-systems learn the preferences of the operator which can be applied before or after particular parameter limits or boundaries have been established within defined learning sets and fine adjustment learning sets. The skills of a particular operator may become part of the base line control dynamics limits and functional control characteristics such that you could acquire the skill set of one or more people operating a vehicle and capture their control response capability and characteristics such that in the operation of a vehicle within one or more learned control presets would allow for selecting the desired operator or operators learned control dynamics characteristics. There is the option of building upon the captured or recorded response capability and characteristics and/or applying changes via computer simulation input to adjust the weightings and thresholds within the learning system and/or combining of the various elements described. Such advanced intelligent controls would allow for vehicles to be tuned to a particular contact surface with a particular surface condition by a particular person as a baseline of operation and control dynamics characteristics that can be altered to fit the operators preferences within safety limits imposed by the manufacturer of the vehicle. Such control systems would be offered as a vehicle option for the purpose of providing safe and precise vehicle operation by maximizing the capability of the operator in controlling a vehicle by means of intelligent motion control systems.

BRIEF DESCRIPTION OF THE DRAWINGS

Embodiments of the invention are described in detail in the following specification that refers to the accompanying drawings. The drawings, however, are merely illustrative of how the invention might be put into effect, so that the specific form and arrangement of the various features as shown is not to be understood as limiting on the invention.

FIGS. 3 (A) & (D) represent adaptable nozzle positions for optimizing propulsive force. FIGS. 3 (B) & (E) represent adaptable nozzle positions for the application of vectored thrust for steering. FIG. 3 (C) represents a neutral position. FIG. 3 (F) shows the possible range of motions allowing for various combinations of the positioning of the adaptable nozzle.

DETAILED DESCRIPTION OF THE PREFERRED EMBODIMENTS

Figure 1:
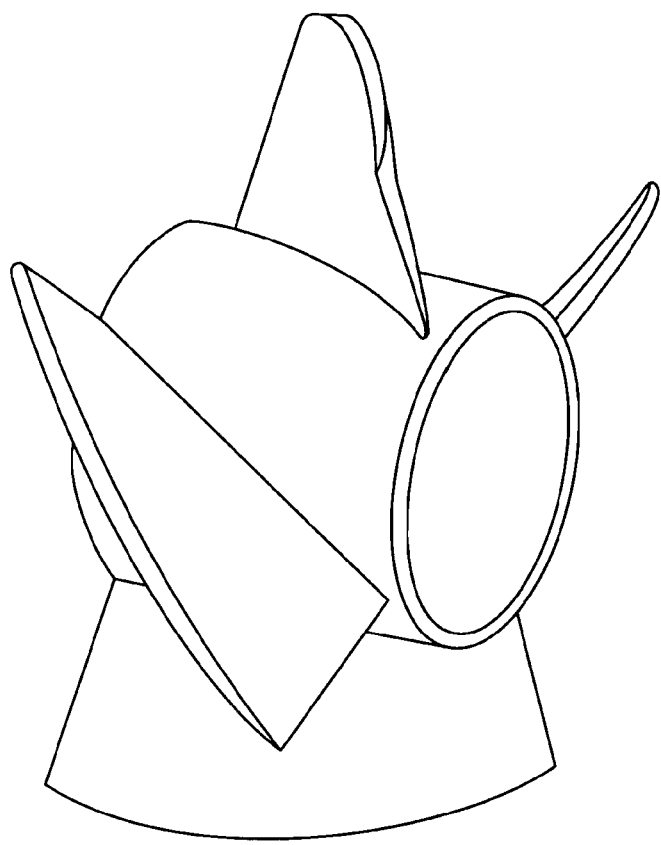
FIG. 1 shows an impeller in accordance with one embodiment of the invention that can be incorporated into the wheel hub of the amphibious vehicle for the purpose of converting electric power into fluid flow. As such, the impeller creates a wheel hub impeller for use within a jet drive system for use within amphibious aircraft or other amphibious craft. The impeller blading may be fixed and optimized. Furthermore, the blade or wing profile may consist of a varying pitch angle from the root to the tip region.

Some of the embodiments of the presently disclosed apparatuses and methods include an improvement in marine drive systems for amphibious vehicle or marine vessel operation and control within intelligent motion control systems. There may be a total systems integration of electric in-wheel motor/generators or motor/generators with impellers that uses magnetic torque applications for motoring in water to match outlet nozzle geometry to maximize thrust to applied power and vehicle or vessel velocity, and match nozzle direction and sizing to heading and vehicle or vessel velocity. In certain embodiments, electric power for in wheel motor/generators or motor/generators from a generator may be powered with conventional internal combustion engines or other type of engine such as a turbine and/or other stored electrical power. Fully integrated electrical torque applications of in-wheel motor/generators or motor/generators may be delivered with sufficient power density to effectively brake and maneuver amphibious vehicles or marine craft of any weight. Embodiments may provide for optimum control capability due to accurate information as to true input power and increased speed of the control dynamics; thus, more effective levels of motion controls are now possible.

Another embodiment may provide a unique means of amphibious vehicle control or marine vessel control, wherein the use of electric in-wheel motor/generators or motor/generators with impellers combined with active nozzle controls is combined in such a manner as to create significant advantages over prior art marine jet drive and control systems. This may be accomplished by precisely measuring the input torque of in-wheel motor/generator or motor/generator by measuring applied power (current and voltage) wherein the nozzle configuration and outlet sizing is based on maneuvering action required at that power level and directly related to an optimum outlet nozzle configuration which is provided for by the control system.

The associated motor and nozzle control system and controls software are integral to the operation of the in-wheel motor/generators or motor/generators and adaptive (variable and steerable) outlet nozzles and account for its flexible and increased levels of safety and performance. A digital signal processor activates the electromagnets of the in wheel motor/generator or motor/generator by analyzing rotor position via hall sensors, desired or target torque value via operator input controls, true torque via current measurements and the state of the voltage of the energy storage device and the power management system that applies current to the motor via Pulse Width Modulator (PWM) electrical power controls. Adaptive software algorithms adjust the current level within each individual electrical coil within a particular phase and adjust the excitation sequence of each individual phase to maintain the in wheel motor/generator at the optimal magnetic torque condition for a particular torque demand requested by the operator. The motor control system dynamically reconfigures the motor/generator current level and/or voltage and/or polarity thousands of times per second such as to produce maximum peak torque efficiency while simultaneously providing a high level of maneuvering (forward, reverse and steering) control. The adaptive outlet nozzle motor controller directly drives each individual vane of the adaptive outlet nozzle wherein each vane is coupled to an electromagnetic actuator controlled by microprocessor subsystem embedded in the overall intelligent motion control system wherein decision-making algorithms track and analyze true and desired vehicle, heading, and speed identifying positive and negative torque requirements instantaneously and delivering electrical power precisely to each individual motor/generator and electromagnetic vane actuator which is extremely fast and adjusting the adaptive outlet nozzles based upon producing maximum thrust and/or efficiency for a particular operator input control demand.

In some embodiments, rotational position and velocity of the individual impellers may be accomplished for the type of electrical motor used by means of a hall effect sensors or imbedded sensing coils or a sensorless means is incorporated wherein the counter electromotive force (CEMF) generated within the stator coil is used such that when the permanent magnet rotor is rotating providing rotor position and velocity information thus allowing for determination of timing for energizing the stator coils based thereon and causing current flow within the stator coils thus causing the application of magnetic torque which accordingly causes the rotor to rotate.

For electric powered amphibious vehicle and marine vessel applications, the disclosed apparatuses and methods may enhance dynamic performance and control by providing high levels of both positive and negative torque at the wheel or impeller that is 100 times faster in control dynamics than throttle control of IC engine wherein the motor/generators exhibit high torque and power density which enables many application benefits including decreased drive train weight and an increase in available interior volume.

The motor's low-speed torque and fast response time greatly improves advanced vehicle systems such as the regenerative braking extends the vehicle range by reapplying electrical power from the generated electrical power wherein power controllers drive the motor/generators independently providing electrical power to the motor/generators individually wherein the vehicle control system is used for distributed torque application and energy management. Combining these separate expensive systems into a single vehicle dynamic control center for the vehicle results in a cost-effective solution that provides higher levels of safety and functionality and a seamless amphibious or marine propulsion system integration for various applications.

There are three main components to the motor controls: the interface, the Digital Signal Processor (DSP), and the power electronics.

The interface converts operator inputs, vehicle model or application-specific electrical inputs, or data from an application data link into signals that can be directly read by the DSP. The DSP monitors inputs from the interface and computes appropriate response to those signal based on advanced control algorithms generated from testing relating input power to applied torque to the wheel or impeller and the associated thrust to an associated nozzle size and/or geometry. Responses are converted into a specific drive sequence for each coil set or series of coils in the motor/generator through IGBT or IGCT power electronics. Depending on the application, several drive profiles are used to enable the motor/generator to provide optimized, efficient torque and power for various required fluid flow rates. The power electronics, at the command of the DSP outputs, adjust the provided current and voltage. The motor hardware includes sensors that provide relevant and critical feedback signals to the DSP through electronics and control systems that form a feedback control loop.

Computed signals and sensors in the motor/generator and controller typically include but not limited to motor temperature, speed of motor, position of motor (in its rotation cycle), input bus voltage, input bus current, phase current and magnetic flux wherein based on the feedback data, the control system and the motor/generator function of torque applications can be changed, or adapted, with the next set of signals from the nozzle position indicators the DSP sends control signals to the power electronics and then into the motor/generator. In this way, the control system dynamically reconfigures the motor/generator to operate at peak efficiency for a certain thrust level and minimize total energy consumption. In addition, the control system continually monitors the individual motor and vehicle operating characteristics to determine precise torque control and monitor for the presence of any disruptive faults.

The specific algorithms that the DSP follows to create and send signals to the motor/generator can be varied according to vehicle operational inputs and vehicle dynamics at different points in time for the vehicle or application performance profile such as actual and desired heading, velocity and angle of trim tabs or nozzle position.

Electric motor/generator can be used in electric vehicles with each wheel being an independent drive configuration. Within every wheel, there can be one "Direct-Drive In-Wheel Motor" to generate the necessary torque applications per wheel. Unlike conventional "central drive unit" systems, torque as well as the power and speed can be supplied to each wheel independently.

Adaptive inverse control (AIC) scheme incorporating Dynamic neural network (DNN) controller and conventional feedback controller may be used wherein the AIC can decouple the dynamic control of the amphibious vehicle or marine vessel motion in the plane to direct rotational speed control of independent wheels or impellers, and precise trajectory control can be achieved.

Whenever generating an amphibious vehicle or marine vessel model for an intelligent motion control system the most important and the most difficult part of the vehicle model is to characterize the fluid flow characteristics wherein equipment is used that allows the fluid flow to be modeled on the vehicle or vessel by measuring the forces, moments and changes in fluid flow and effective outlet nozzle sizing produced by and upon fluid flow. In order to determine exactly how the fluid flow is interacting with the adaptive outlet nozzle surface which involves running the vehicle in constant-radius circles on the water at gradually-increasing speeds, running at fixed speed with either stepped or gradual steering inputs or emulating an on-water corner-entry/mid-corner/exit maneuver to gather steady state and dynamic information which is recorded within a knowledge base. All of the measured data is recorded and then regressed to produce an accurate fluid flow model wherein said fluid flow model is input to an intelligent control system to identify its behavior and the degree of change in effective adaptive outlet nozzle sizing from the previously recorded observed behavior of the fluid flow during data collection. This allows nozzle adjustments to take place that reflect optimum vehicle performance with history-referenced data thus allowing for maximum thrust and/or efficiency in control of the marine jet drive vehicle when in the water.

In order to define the maximum efficiency of the motor/generator combined with the marine drive system we have to measure the motor/generator efficiency at various rotational speeds thus generating an efficiency curve defining the motor/generator efficiency at any point on the associated pump performance curve. In order to develop the needed information to optimize the overall system performance efficiency curve associated with the adjustable outlet nozzles size and/or direction we can use information about the mass flow rate (flow rate×fluid density) times the head pressure to calculate the required power in watts at any point on a pump performance curve and compare to the actual true input power in watts (divide the calculated required value by the measured value wherein the measured value accounts for the electric motor/generator efficiency at that operating point) to determine the overall system efficiency of the marine jet drive system overall at that operational point wherein the total system efficiency is the product of the individual motor/generator and pump efficiency operational curves wherein when at a particular operating point on the pump operational curve testing would measure overall efficiency while making small incremental adjustments to the outlet nozzle size until a peek value of efficiency is measured wherein an adjustment up or down from that point would decrease maximum overall system efficiency that is measured at said operating point during testing thus developing optimal outlet sizing data at various operational input power levels supplied to the electric motor/generator at a particular fluid density thus generating a knowledge base for the control system algorithms such that the nozzle sizing is directly related to the input power for a particular fluid density. The overall operational efficiency maybe monitored during operations to provide for indication to the operator and/or warnings due to problems that might arise from foreign objects clogging the system or other undesired condition or operational state.

In an alternate embodiment, to define the maximum thrust for the water jet of the motor/generator combined with the marine drive system we have to measure the motor/generator efficiency at various rotational speeds thus generating an efficiency curve defining the motor/generator efficiency performance curve at various rpm. In order to develop the needed information to optimize the overall system performance for maximum thrust associated with the adjustable outlet nozzles size and/or direction we can use information about the mass flow rate (flow rate×fluid density) times the exit velocity of the fluid to calculate the thrust force generated and the required power in watts at any point in time and compare to the actual true input power in watts (divide the calculated required value by the measured value wherein the measured value accounts for the electric motor/generator efficiency at that operating point) to determine the overall system thrust efficiency of the marine jet drive system overall at that operational point wherein the total system thrust efficiency is the product of the individual motor/generator and pump efficiency operational curves wherein when at a particular operating point on the pump operational curve testing would measure overall thrust efficiency while making small incremental adjustments to the outlet nozzle size until a peek value of thrust efficiency is measured wherein an adjustment up or down from that point would decrease maximum overall system thrust efficiency that is measured at said operating point during testing thus developing optimal outlet sizing data at various operational input power levels supplied to the electric motor/generator at a particular fluid density thus generating a knowledge base for the control system algorithms such that the nozzle sizing is directly related to the input power for a particular thrust level desired. The overall operational thrust efficiency maybe monitored during operations to provide for indication to the operator and/or warnings due to problems that might arise from foreign objects clogging the system or other undesired condition or operational state.

The design for maximum thrust and/or efficiency may be combined in varying degrees for the particular need and may be on a sliding scale basis as to weighting of the two design criteria.

The advantages of a fully integrated electrical motion control system which incorporates this new control relationship between applied torque, effective nozzle sizing, heading and velocity is that it enables unprecedented levels of performance, stability, steerability and stopping distance for any type of marine jet driven vehicle allowing for various intelligent control systems to be improved in capability and fully integrated together enabling precise applications of positive or negative toque at the impeller and allow for control in a dynamic fashion wherein vehicle dynamics are used along with other input data to achieve accurate information for the purpose of increasing the effective level of control providing for optimum control of a marine jet drives in normal and emergency conditions.

Braking application may be such that as in an emergency-braking event is to directly short the output of the motor/generators. Such shorting can be applied by various means one of which would be of a modulated short by using a Pulse Width Modulator (PWM) control to control the frequency and duration of the shorting event thus creating extremely large values of current and thus generating extremely large values of braking torque wherein there is precise control as to the amount of torque applied. Such emergency braking can be designed to be fail safe wherein power is applied to cause normal closed contacts to be opened with the application of power and upon loss of power the contacts close causing a direct short of the output coils of the in-wheel motor/generators thus applying a braking force in the case of a total loss of power.

The disclosed apparatuses and methods can be used in combination with devices used for controlling steering, acceleration rates and deceleration rates such as, for example, with automatic brake intervention which provide for improvements in feedforward and feedback control for vehicle safety, stability, comfort and maneuverability. Such active systems can control steering and brake control systems wherein some systems activate independent of the operator input via automated control and/or assist with the operator input wherein such input is from a steering wheel, brake pedal, accelerator pedal, or other input such as steering or towing mode via a control switch, voice command or automated control.

In the braking of the vehicle the kinetic energy of said vehicle can be converted into electrical power, which may be dissipated through a resistor bank and/or stored for later use when the vehicle is performing maneuvers, or may be used at the time of braking to increase the effectiveness of the electromagnetic braking system by instituting the use of motorized braking action wherein the wheels of the vehicle are caused to motor in opposition to the rotational direction, thus increasing the overall effectiveness of the braking system reducing stopping distance and adding stability and safety to said vehicle.

Power inverters/converters used can be based on SCR, GTO, IGBT or IGCT switching controls and Silicon Carbide based switching controls offer smaller and more efficient lightweight design possibilities.

The technique used to produce AC current from DC is called Pulse Width Modulation (PWM). Pulses of different length are applied to the IGBT's in the inverter, causing the DC current to be delayed by the inductive load and a sine wave is modulated. A fast switching frequency in the power converter improves emulation of a sine wave mainly by eliminating some of the higher order harmonics. To reduce the harmonic content even further, a filter consisting of capacitors and inductors can be coupled on the AC side of the output.

One possible implementation within amphibious craft of such power converters would be to modulate the frequency and duration of a direct short of the generated electrical output power for normal service braking operations or high power emergency braking or RTO for amphibious aircraft during braking situations thus the magnetic braking system and method does not require a high power electrical power source such as from an auxiliary power unit (APU) to provide electrical power for braking function thus increasing the safety level for an RTO situation wherein the loss of an engine with a permanent magnet starter/generator could lead to a loss of generated electrical power but would not affect the braking capability.

The magnetic motoring system and method requires an electrical power source. For an amphibious application such electrical power could be from an auxiliary power unit (APU) and/or permanent magnet generator imbedded into a jet engine that includes an electrical backup power supply such as from a multi-capacitor bank consisting of light weight nano enhanced ultra-capacitors or nano-capacitors that can be fully charged at the terminal or dock during amphibious servicing of the aircraft via an electrical connection such as is currently used by amphibious aircraft when parked at the pier or terminal.

Within amphibious applications the fully charged capacitor bank would allow for motoring of the aircraft backwards into the water ramp way and allow for forward motion taxiing without the use of the engines thus reducing noise and air pollution within the terminal or water ramp area. When the engines are started and the APU is running the APU and/or capacitors could be used to supply power to the in wheel hub motor/generators such as to provide assistance in forward motion to significantly reduce the fuel burn on takeoff from land or water.

One significant concern in brake design is the dissipation of kinetic energy of the vehicle within the braking system in hard or emergency braking conditions. Ultimately, during ground operations it is the rolling friction present between the tires and the contact surface, which slows the vehicle, thus brake capacity requirements are based upon maximum weight of the vehicle and downward force exerted upon the tire and the rolling friction of the tire contact patch. Braking systems of the prior art are relatively inflexible with respect to the manner in which they generate the required braking force wherein antilock braking systems (ABS) are required to prevent wheel lockup by correcting for excessive deceleration rates of the wheel. Our system and method of braking incorporates the use of a fully integrated electrical control system which is inherently antilocking with inherently fast control dynamics thus allowing for precise computer control of the deceleration rate of the wheel matching the maximum value of friction for the particular adhesion coefficient wheel slip curve determined for maximum stable braking force precisely such as to prevent excessive wheel slip ratio (relative difference between rotational velocity of the wheel and vehicle velocity) and thus preventing wheel lockup. In order to calculate the wheel slip ratio we measure the angular velocity of the wheel w directly using the hall sensors used for motor controller for the in wheel hub motor/generator and the speed of the vehicle v which is provided for by DGPS signal source.

Antilock braking systems (ABS) are widely used in motorcycles, automobiles, trucks, tractor-trailers, buses and aircraft. In an emergency braking situation the wheels of a vehicle tend to lock quickly, increasing the longitudinal slip ratio (s) of the vehicle wheels. The slip ratio (s) is defined as the difference between the velocity of the vehicle (v veh) and the circumferential velocity of the tire (angular velocity of the wheel (w whl) multiplied by the effective radius of the wheel (re)), divided by the velocity of the vehicle: $s=(v\ veh-w\ whl\cdot re)/v\ veh$. When the lock of the wheel is total ($s=1$), vehicle steering control, stability and the friction coefficient diminishes, and the braking distance normally increases. Accurate values of angular velocity of the wheel (w whl) are directly measurable wherein the measured value can be from the hall sensors or other suitable measuring means used in the motor controller section used for sensing rotor position, speed and acceleration which are also used to calculate the effective rolling radius of the wheel (re). It is possible to also measure the free rolling radius of the wheel (rfree) wherein a selected single wheel for which the rfree is to be calculated is from a coasting wheel wherein there is no cornering, braking or motoring (i.e. no application of positive or negative torque to the wheel hub motor/generator or steering) of said selected single wheel wherein said coasting wheel provides directly measurable and accurate angular velocity of the wheel and when combined with the velocity of the vehicle (v veh) which is provided for by DGPS signal source combined with accelerometer data we can directly and accurately calculate the free rolling radius of said selected coasting wheel. Once the value of the effective rolling radius is determined for said selected coating wheel then said selected wheel is no longer coasting. The said selected wheel is now a non-coasting wheel wherein the calculated effective rolling radius is then used to determine the circumferential velocity of said selected wheel (angular velocity of the wheel (w whl) multiplied by the effective radius of the wheel (re)), which is now a non-coasting wheel (i.e. there is application of positive or negative torque). Thus we can use the precise circumferential velocity of the non-coasting wheel and combine it with the precisely known vehicle velocity to calculate the slip value that is extremely accurate wherein such calculations are used to develop the adhesion coefficient slip ratio incorporating true values of slip. Such precise information as to the tire's true effective rolling radius also affects the tire contact patch length due to tire pressure and tire loading of each individual tire associated with each wheel on the vehicle wherein the control system calculates the circumferential velocity of the wheel based upon accurate rolling radius and leads to minimizing errors in the calculated circumferential velocity of the each wheel which affects the calculated slip and the calculated adherence coefficient values. Therefore, the goal of the ABS and other integrated control systems of the presently disclosed apparatuses and methods is to accurately calculate the slip ratio thus enabling said integrated control system to obtain the peek value for the adherence coefficient curve for each tire precisely and dynamically. For example, in an amphibious vehicle with four wheels knowing the exact value of the effective rolling radius provides for increased accuracy of the slip values used in the ABS and other integrated control systems wherein the limits of braking power applied are dynamic in nature such that as the vehicle center of gravity shifts in a hard braking and/or hard cornering event the front wheels sense an increase in loading combined with precise values of each wheel velocity thus an associated increase in braking power that is allowed by the ECU for each front wheel and the rear wheels sense a decrease in loading combined with precise values of each wheel velocity and thus an associated decrease in braking power that is allowed by the ECU thus optimizing the braking capacity of the vehicle's wheels individually and increasing the associated tires performance capability.

A simple and low-cost way to construct a Tire Pressure Monitoring System (TPMS) is to utilize the already existing wheel speed sensors and ECU of the ABS system wherein a tire's rolling radius depends on the air pressure inside for a particular loading for a particular tire thus eliminating the need for a special tire with sensors or tire sensors thus reducing complexity and cost thus allowing the selection of any after market replacement tire by the owner/operator of the vehicle. This is accomplished by means of a calibration/monitoring system that sequentially removes one wheel at a time from service that is in steady state condition or operation wherein steady state is defined to be straight line or near straight line movement of the vehicle wherein the removed wheel from service is not aggressively used for cornering, braking or accelerating of the vehicle such that the wheel is defined to be in a coasting mode while in calibration thus there is no slip applied to the selected wheel for calibration wherein the slip value is zero thus the measured angular velocity of the wheel (w whl) multiplied by the effective radius of the wheel (re) must be equal to the actual vehicle velocity (v veh) as determined by accelerometer data combined with DGPS data wherein the measured angular velocity of the wheel (w whl) signal from one wheel is compared to the calculated vehicle velocity (v veh cal) and any error value between the measured (v veh) and calculated velocity (v veh cal) is corrected such that the effective wheel radius is adjusted to reduce the error to zero within a control loop thus allowing for precise calculation of and calibration of the actual effective radius of the wheel due to the deformation of the vehicle's tire when in contact with the contact surface which defines the contact patch geometry as to the length of the patch as the width of the contact patch is set by the tire's geometry such that the tire patch length can be determined for a particular tire used and combined with loading information at each wheel suspension to define the over or under inflated state of the tire for a particular loading wherein loading is sensed for each individual wheel dynamically through a pressure or load sensor within the suspension. Such a calibration and/or monitoring system could determine the under or over inflation of the tire as determined for a specific baseline data set of tires or known tire parameters that could be included as input data to other automated control systems such as TPCS that are designed to maintain proper tire inflation pressure and/or provide for a warning function as to the presence of a slow leak or catastrophic loss of tire pressure. Proper tire pressure is vital to maximizing tire adhesion for maximum traction and for extending tire life and increasing fuel economy and this unique calibration/monitoring system allows for precise knowledge of the effective rolling radius for each individual tire thus allowing for precise knowledge of the slip value for each of the vehicle's tires after the calculated effective radius of the wheel (re) is stored within memory and applied to the slip calculator thus providing for accurate determination of the adhesion coefficient value for use within the ABS or other control systems which is capable of determining the contact patch length exactly thus providing information as to the status of the tires such as under or over inflation and loading wherein such information can be used to adjust tire pressure for an optimal contact patch length for a particular loading on a particular tire and provide for operator warning of an overloaded or otherwise undesirable condition.

The ABS must be able to account for external disturbances such as variations in the adhesive force between the contact surface and tire due to changes in contact surface conditions, angle of terrain, loading, steering and variations in frictional forces due to irregularities in the contact surface. The objective function of the ABS within the disclosed apparatuses and methods is to apply and maintain braking force such as to track the optimal dynamic wheel slip during a braking event such that each wheel is applied maximum braking force as determined by the desired dynamic peek value of adhesion as determined by the associated [µ-s] (coefficient of adhesion versus wheel slip) value for a particular vehicle dynamics and particular tire dynamics wherein tire properties that are taken from empirical tire domain knowledge in a particular condition (i.e. fingerprinting the tire characteristics using optical systems or other suitable measuring devices to teach the system the tire characteristics for a particular vehicle, wheel and tire combination in a test setup), on a particular contact surface with a particular surface condition so as to achieve maximum wheel traction force during maneuvering test thus significantly increasing operator control capability in maneuvering and achieve maximum vehicle deceleration rates thus significantly reducing stopping distances. There will be a price paid in computation time to acquire domain knowledge, but as long as this knowledge is stored and reused, the problem and further instances thereof may be solved in a shorter time thus neuro-evolutionary control methods are well suited for this task of learning. The empirical tire domain knowledge should be simple to modify to allow for automatic learning. A problem-solution description, which permits learning, will generate the more 'intelligent' motion control system.

Achieving this goal is difficult, because the ABS control systems need to know the exact point within the adhesion values [µ-s] for maximum adherence which varies with many parameters such adherence conditions between the contact surface and the tire contact patch length such as contact surface conditions, tire wear, vertical load, inflation pressure, longitudinal slip ratio, friction coefficient, cornering stiffness, and the conditions of real adherences dependent upon the maneuvering condition i.e. turning, stopping, accelerating, angle of terrain and any combination thereof. Achieving this target peek value of the adhesion coefficient value with accuracy is a difficult task in current ABS due to the lack of accurate data as to the effective wheel radius and anticipated change in wheel radius due to learned values during shifting center of gravity and/or loading and the time lag or speed of the control dynamics of the feedback loop when using friction based braking.

To obtain the real longitudinal slip ratio that each wheel of the vehicle is undergoing, it is necessary to know the linear speed of the vehicle and the circumferential velocity information of each wheel. The direct measurement of the vehicle velocity is accomplished through the use of accelerometers and GPS and/or differential GPS (DGPS) information allowing for precise determination of the vehicle velocity and when this vehicle velocity information is combined with accurate circumferential velocity information of the wheel, due to accurate information of effective wheel radius of the tire, and anticipated change in wheel radius due to learned values during shifting center of gravity and/or loading it is possible to directly determine wheel slip velocity for each individual wheel in real time and thus allowing for control of the wheel slip velocity for each wheel during braking and/or accelerating within extremely tight tolerances defined by the coefficient of adhesion which is determined by means of knowing the exact input torques to each wheel and the reactionary value of slip due to the adhesion or friction coefficient values present at that instant in time thus allowing for higher levels of acceleration and effective braking when using intelligent controls such as Yaw Control Stability System (YAC), Automatic Braking Control (ABC), Anti-lock Braking Systems (ABS), Traction Control Systems (TCS), Electronic Stability Control (ESC), and Automated Collision Avoidance Systems (ACAS) which is lacking in the current art.

The use of a fully integrated electric in wheel motor/generators with electrical controllers will greatly minimize time lag delay within the control feedback loop thus significantly minimize error that exist in conventional controllers. This controller also avoids estimations by relying on observer values or measured input thus reducing errors that are present within conventional ABS systems that use pre defined or estimated values such as empirically derived friction coefficient curves. By measuring the true effective rolling radius, anticipated changes in effective rolling radius due to shifting center of gravity and/or loading values, applied torque and measured slip values errors in controlling the angular wheel deceleration rate is eliminated. The ABS controller may set a desired peak slip ratio according to directly measurable variable parameters. The rolling friction coefficient is a function of the wheel slip ratio and is different for differing tires and tire conditions, differing surfaces and surface conditions and velocities. The optimal slip ratio yields the peek rolling friction coefficient value that varies dynamically. The dynamic variable parameters used for determining the adhesion coefficient between the contact surface and the tire contact patch are tire temperature, contact surface conditions, tire wear, tire drag, vertical load, inflation pressure, longitudinal slip ratio, friction coefficient, cornering stiffness, and the conditions of real adherences dependent upon the maneuvering condition i.e. turning, stopping, accelerating and any combination thereof deriving the peek adhesion coefficient value of tire contact surface as a function of the vehicle dynamics such as the angular velocity of the wheel, inertial measurements such as the wheel and vehicle inertia, motoring torque, braking torque, cornering stiffness, slip angle of tire, friction torque of the wheel and tire, the longitudinal speed of the vehicle, the vehicular mass, the force at the tire contact patch with the contact surface and the true effective rolling radius of the tire. By combining the above information; limits of braking power are calculated and recalculated dynamically allowing the ECU to precise apply the maximum braking power while maximizing control capability of the vehicle operator in real time due to the inherently faster control dynamics of magnetic braking of the in wheel hub motor/generators.

The use of a fully integrated electrical controller will eliminate chattering that exist in conventional ABS controller wherein the cyclic operation of the ABS (the on-off application of braking torque operation) as this controller avoids the on-off application of braking torque operation that is used in conventional ABS systems for controlling the angular wheel deceleration rate. This controller sets a desired peak slip according to the derived peek adhesion coefficient value of tire contact surface using the dynamic variable parameters described above and avoids exceeding desired peak slip of the peek adhesion coefficient value of tire contact surface in the current tire contact surface status thus enabling the braking force to track precisely to the peek value of the adhesion coefficient adhesion values [μ-s] dynamically and not rely on predetermined adhesion or friction coefficient curves.

In these disclosed apparatuses and methods, the electronic control unit (ECU) system controller is optimized and can precisely identify the peek value of the coefficient of adhesion versus wheel slip value [μ-s] dynamically thus yielding optimal braking performance which is capable of reducing braking distances by 15 to 20% or more which is a significant safety improvement over the current state of the art control systems that incorporate Yaw Control Stability System (YAC), Automatic Braking Control (ABC), Anti-lock Braking Systems (ABS), Traction Control Systems (TCS), Electronic Stability Control (ESC), and Automated Collision Avoidance Systems (ACAS) referenced. Such an optimized intelligent motion controller can consist of sliding mode, fuzzy logic, fuzzy-neural, fuzzy-sliding mode, fuzzy-neural sliding mode, artificial intelligent, Brain Based Devices or other suitable control systems and sub-systems such as an advanced intelligent motion control system such as Real-Time Control Systems (RTC) or Dynamic Case-Based Reasoning (DCBR) may be used that incorporates the use of controllers such as to improve the speed and control dynamics of the intelligent motion control system.

Within conventional control systems there are four methodologies for implementing such Electronic Control Units (ECU) or system and sub-system controllers that use Proportional, Integration and Derivative Control (PID), Root Locus, Frequency Response, and State Space Vector controllers for closed feedback control that may be combined in various combinations. The torque control subsystems for each electric in wheel motor/generator or motor/generator operate locally with weighting variables from the intelligent motion control system and are used for optimal motor and braking torque control applications that is executed via a feedback loop around error in velocity plus a feedforward term based on a time-averaged vehicle pitch moment of inertia, to reduce steady-state error when traveling up or down a slope terrain and time-averaged vehicle roll moment of inertia, to reduce steady-state error when traveling on a cross-slope terrain wherein DGPS units at each wheel location are combined with MEMS accelerometers at each wheel location for inertial and positional measurements to generate state estimation data with odometer inputs to the state estimator. Yaw moment of inertia can also be input into the state estimation data for rollover prevention control system.

The ECU framework provides for a platform for diagnostic reasoning and integration for the operational infrastructure of an autonomous condition based control system wherein the integration is provided for by data gathering, information extraction-rules, real-time controls, and decision-rules for critical systems controls. DCBR builds on a learned knowledge base and is self-evolving through genetic algorithms using performance feedback wherein the system refines the rules through an asynchronous data steam of measurements and actions into a compound case structure that organizes the relevant data into the case memory and provides for meaningful decision support through autonomous reasoning mechanisms making use of intelligent control techniques wherein the control loop is closed via active feedback for improvements provided for through adaptive learning. These new intelligent controls systems technologies require data storage of qualitative and quantitative information in addition to signal processing, diagnostics, and prognostics software and hardware structures. Such a knowledge based systems are capable of providing precise, accurate and fast control results by using acquired (recorded) information from a previous point in time (learned experience) and reuse for new (new point in time) and recurring vehicle operational situations wherein the case based reasoning retrieves recorded cases from the case libraries and matches them with a current state of the vehicle to provide a solution similar to one applied to the previous case in time.

Traction Control Systems (TCS) of the disclosed apparatuses and methods can be applied to the in wheel hub motor/generators to be actively controlled by the motor controller at anytime with extremely fast control dynamics not currently available in friction based braking or internal combustion vehicles. Said motor controller can be used to influence any aspect of a vehicle's performance, including motoring, braking, steering and cornering. Control of wheel traction to influence motoring, braking, steering and cornering is accomplished by a comprehensive Traction Control System (TCS) system and requires sensors and control systems with complex control algorithms. Controls systems engineers will design and program Traction Control System (TCS) computers within the intelligent motion controls of the vehicle desired behavior for any situation with the ability to apply advances in mathematics and intelligent controls taking advantage of the fast control dynamics available when incorporating in wheel hub motor/generators for the purpose of maneuvering and braking controls for a vehicle of any type that would benefit from such advantages in precision, accuracy and speed of control dynamics. Sensors on the vehicle will tell the TCS computer what the vehicle's behavior actually is. The computer will then use mathematical models of the in wheel hub motor/generator and vehicle dynamics to determine what actions should be taken to make actual vehicle behavior most closely match desired vehicle behavior. Closed loop feedback can be used to fine tune any algorithms used while the vehicle is being operated wherein such loop feedback may include feedforward to account for disturbances such as terrain influences. The mathematical in wheel hub motor/generator model is used to predict the required application of positive or negative torque, and electrical power required to produce a desired torque at each individual wheel. This model would include motor torque for any RPM, temperature, tire air pressure, loading, terrain etc. Furthermore, this torque can be negative (braking torque). The model would also include things like in wheel hub motor/generator rotational inertia, wheel drag, effective rolling radius, wheel slip, slip angle, steering, braking power, motoring power, vehicle velocity and angular position, and tire torsion stiffness. The mathematical vehicle dynamics model is needed to predict the wheel torque required to produce a desired behavior on the contact surface. This model would include the center of gravity (CG), torsion forces acting upon the CG, aerodynamic forces, masses, moments of inertia, tire information, and suspension positions and be able to predict the impact and affects of the changes in dynamics to the control capability and limits of system control capability. The vehicle dynamics model would be improved with variable contact surface mapping including bumps, hills, corners, turns, banks and other contact surface influences that cause changes in the contact patch geometry and the associated effects on vehicle behavior. The intention of the model is to develop dynamic expressions to be used later on for control purposes and to derive the coefficient of tire-road friction or coefficient of adhesion as a function of the vehicle dynamics.

The models allow the Traction Control System (TCS) to alter the current behavior to desired behavior wherein desired behavior is limited within the confines of a safe operation envelop wherein control inputs from the operator operate within said envelop of safety confines that are defined by the control system rules. During normal braking input commands from the operator are such that regenerative braking is applied and during hard or emergency braking the vehicle will effectively have active motorized braking control wherein regenerative braking controls are removed from the braking control system wherein motorized braking is applied to the individual in wheel hub motor/generators such that a negative torque is applied to the individual wheels to provide for more effective braking power than regenerative braking could apply. If there is too much brake force applied to the in wheel hub motor/generator then the ABS can alter the applied torque to each individual such as to optimize the applied torque according to a defined slip value that maximizes the braking force while maintaining maximum steering control capability. The operator of the vehicle will have quicker braking capability and less concern of locking the wheels, for example locking of the rear wheels and spinning going into a turn or in a steady state corner, if vehicle operator responds to oversteer by decreasing the application to the accelerator peddle wherein such operator action to oversteer can make the situation worse wherein the TCS can use information from the vehicle dynamics model to predict how quickly the application of positive torque (motoring torque) can be rolled off without making the oversteer worse wherein the TCS can then override the operator input until it determines that the vehicle would be stable again under operator control such TCS can also sense or predict oversteer on its own and gently roll off the applied positive torque without any input from the driver. TCS operation during acceleration is such that when a tire circumferential velocity matches vehicle velocity by definition there is zero slip and thus no forward force applied to the tire, so the tire will slip slightly to accelerate the vehicle wherein the acceleration increases with slip until it peaks at an optimum value which can be determined by the calculated slip and then acceleration decreases with additional slip beyond this peek value of slip. So we want the control system to operate at the peek of the curve for optimum performance capability wherein complex combinations of braking, cornering, and acceleration have to be considered in order to maximize performance in these instances and influence the control so that the vehicle operator has confidence the vehicle will respond to operator input control in a safe and controllable manner thus achieving fast and accurate responses with minimal tracking error wherein such controllers are further optimized over time by learning via adaptive feedback/feedforward controller architectures and/or symbolic machine learning and/or artificial intelligent, Brain Based Devices thus automatically building the rules based reactions for separate designated control task reducing the development time in establishing the limits or boundaries and rules for the various system and sub-system controllers. Such adaptive learning alters the weighting of variables as the various systems and sub-systems learn the preferences of the operator which can be applied before or after particular parameter limits or boundaries have been established within defined learning sets and fine adjustment learning sets wherein the skills of a particular operator may become part of the base line control dynamics limits and functional control characteristics such that you could acquire the skill set of one or more people operating a vehicle and capture their control response capability and characteristics such that in the operation of a vehicle within one or more learned control presets would allow for selecting the desired operator or operators learned control dynamics characteristics wherein you have the option of building upon the captured or recorded response capability and characteristics and/or applying changes via computer simulation input to adjust the weightings and thresholds within the learning system and/or combining of the various elements described. Such advanced intelligent controls would allow for vehicles to be tuned to a particular contact surface with a particular surface condition by a particular person as a baseline of operation and control dynamics characteristics that can be altered to fit the operators preferences within safety limits imposed by the manufacturer of said vehicle wherein such control systems would be offered as a vehicle option for the purpose of providing safe and precise vehicle operation by maximizing the capability of the operator in controlling a vehicle by means of intelligent motion control systems.

Software algorithm design considerations associated with the control loop of the system. After power-up or initialization by the control system timer system, the RAM is cleared, the stack pointer is initialized, and the I/O ports and registers are configured by setting/resetting relevant bits. The internal control system timer is initiated, and interrupts are enabled. Various wheel slip control software modules and subroutines are initialized, control flags are reset, and addresses and parameters are configured and detect system failure and initiate a system shutdown and driver warning mechanism. Determine if anti-lock action should be allowed based on the failure status, vehicle velocity, wheel speed and system failure status as inputs.

Three major subsystems to the Electronic Control Unit (ECU) are the following:

1. Wheel speed and deceleration calculation: The hall sensors within the motor/generators generate a signal with positional information and the wheel rotational velocity. The input capture ports on the microprocessor can capture the value of the free-running timer on every transition of the hall sensor signal pulse. In that way, wheel speed can be obtained. By combining both past and present velocity values, the wheel acceleration or deceleration can be calculated. Wheel slip is calculated by comparing actual vehicle velocity with actual circumferential wheel velocity that uses a calibrated effective rolling radius value.

2. Control output power calculation: In this subsystem, wheel characteristics obtained from the above subsystem are used to calculate the appropriate control command to adjust the braking power current modulator if emergency or hard braking is commanded by the operator.

3. Mode Selector: The calculated results are used in this subsystem to activate the proper braking mode regenerative, dynamic or motorized braking wherein the mode selection is based on vehicle velocity and the demand for normal, hard and emergency braking form the operator wherein each mode is defined by the rate at which the brake peddle is depressed. The output commands of the motor controller for normal braking mode institutes regenerative braking that is such that the connection terminals of the motor/generator coils are applied to an energy storage device such as ultracapacitors, nanocapacitors or other energy storage device wherein the terminal voltage is monitored by the charging system controls for proper operation such as to prevent over charging of the storage devices that can change mode of braking such that the system allows for precise control of the braking force applied at each individual wheel. The output commands of the motor controller for hard braking mode institutes dynamic braking such that the connection terminals of the in wheel hub motor/generator coils are shorted through the use of a Pulse Width Modulator (PWM) such that the PWM is controlling the short duration and frequency of operation allowing for precise control of the braking force applied at each individual wheel. The output commands of the motor controller for emergency braking institutes motorized braking such that the connection terminals of the in wheel hub motor/generator coils are supplied electrical power through the use of a Pulse Width Modulator (PWM) control of an electrical power source such that the supplied electrical power is controlled in duration and frequency of operation allowing for precise control of the motorized braking force wherein the applied torque to each individual wheel is in opposition to the rotational direction of each wheel allowing for precise control of the braking force applied at each individual wheel.

The above information is used to determine wheel slip for each wheel and contact surface friction coefficient or adhesion coefficient wherein at the end of the control loop, various parameters like wheel speeds, acceleration or deceleration of the wheels, vehicle velocity, etc; are stored in RAM for future reference.

Such an Intelligent Control System Engine may contain the following: Conditions, Actions, State Items, Monitoring Interface, and Filters wherein Conditions can be used in many parts of rules based control system and can control rule execution and situation detection. Depending on the context in which a condition is used such as weather condition, contact surface condition, tire condition, and other number of parameters can be accessed in the condition evaluation process. State items can be accessed from a condition in every context. State items are global and does not belong to any particular rule or rule instance. This means that in every place where a condition can be used its result can depend on the existence of a state item. After a situation is detected there is an option to evaluate a condition. The condition can access all the parameters of the events that took part in the situation detection within the goals context of the control system. There are two different kinds of Actions that can take part as the last step in the execution of a rule instance. One is a positive action, executed when a situation is detected. The other is a negative action executed if a situation is not detected. The action of a rule is executed if the condition is true, if the rule has the condition part activated. Without an enabled condition part the actions are executed directly after the situation detection process decides that a situation is detected or that it can not be detected at all. The action of a rule can consist of several action items that should be executed. Action items supported are executing scripts, creating an event or creating or deleting state items. The action is the mechanism through which intelligent control system can inform external applications that a rule has triggered. An action item executing a script could for example write data into an applications database indicating a rule triggering. A State Item in intelligent control system is used to model any kind of activity that have a duration. By definition, an event happens in a specific point in time while a state is created at one point of time and deleted at a later point in time. The state management feature gives intelligent control system the capability to detect situations that are of interest only when a specific state is active. A state could for example be used to model "operating hours" or "last service interval" or any other period of time. By using a reference to a state item in a condition evaluation it is possible to suppress a rule or control the detection of a situation depending if a specific state item exists. For example, a rule for the detection of a disturbance could be disabled during parking or docked status of vehicle and only be active during operation of the vehicle. State items can also be used to control the situation detection process in many ways. One example is to delay the reporting of a detected situation if a particular state exists. Coupled to each rule there is a filter. The filter evaluates an event before an event reaches the rule. The filter may decide to drop any event based on event contents (spurious content) or if a state item exists or not (verification of systems status and functional state). The filter may also decide to drop any events sent to a rule, due to noise or outside safety envelop of operation. Filters are an efficient method to disable a rule during periods of time that they are not required or wanted based on design criteria for the vehicle control dynamic states. The Monitoring Interface of the intelligent control system Engine provides an easy access to data about rule definitions and rule instances. The monitoring interface provides a real time snapshot of the internal state of the intelligent control system Engine. The monitoring interface is implemented through a computer controller that publishes monitoring with number of functions. These functions can be used to fetch data about rule instance, rule definitions, situation detectors, action items, condition evaluators and event history which provides run-time status information about the intelligent control system Engine. The Condition part of the rule is a Boolean expression. It is evaluated after the situation of the rule is detected. The condition expression can refer to the parameters of the events that took part in the situation detection. By defining a condition to a rule you can make sure that a certain condition is valid after the situation is detected. When the situation of a rule is detected, the condition is evaluated. If the condition is true, the rule's action is executed. The action is the way you will know that a rule has fired. An action can execute an application, create or delete a state or create a new event wherein the event can also be sent back to the input queue of the intelligent control system Engine creating a control loop.

Moreover, a vehicle driven by drive by wire or drive by wireless systems incorporating the use of electric in wheel motor/generators provides for unique advantages over the prior art intelligent control systems wherein vehicle control systems that drive and brake each wheel independently wherein the applied torque to the in wheel motor/generator is known precisely not estimated and the control dynamics is extremely fast thus allowing for unprecedented intelligent motion controls of a vehicle wherein intelligent control systems can be integrated together such as Automatic Braking Control, Anti-lock Braking Systems (ABS), Traction Control Systems (TCS), Electronic Stability Control (ESC), and Automated Collision Avoidance Systems (ACAS) referenced into a combined functioning control system. The significant advantages of such a system are due to the fact that the motor/generators can achieve either acceleration or deceleration torques applied to various wheels in various directions and combinations thus allowing for the safe and effective design of new control systems that provide increased levels of control, comfort, and durability comparable to conventional prior art.

Within an amphibious vehicle each wheel with an in wheel motor/generator can generate positive or negative torque values on the left and/or right wheels, and/or front and/or rear wheels in various combinations to enhance vehicle steering control capability. A permanent magnet DC motor or servo is coupled to the steering column is used with the steer by wire steering unit to provide steering control through a Pulse Width Modulated (PWM) interface, increase stability and control wherein such vehicle steering maneuvers consist of all-wheel steering (front steering and/or rear steering) that can be initiated automatically, by operator input or automatically assist the operator wherein such maneuvers allow for increased levels of safety in operation and for accident prevention. Such a steering system would incorporate high speed and low speed steering modes wherein the angular movement and positioning control of each wheel is achieved by means of an articulated moveable linkage that is electromagnetically actuated wherein the steering is assisted from differential motoring and/or braking of each wheel. These disclosed apparatuses and methods allow for effective active safety devices to perform at levels not available to current state of the art active safety control systems due to the control dynamics of the in wheel motor/generators being fast, precise, and accurate.

Braking can be accomplished by means of motor action also known as motorized braking wherein magnetic torque interactions between the rotor and stator sections apply a braking force to the wheel and tire assembly by applying a rotational force to the wheel motor/generator that is in opposition or opposite to the rotational direction of the wheel wherein the electrical power is from a generated or stored electrical source.

In some embodiments, the wheel motor/generator functions as a brake by means of generator action also known as regenerative braking wherein magnetic torque interactions between the rotor member and stator member sections apply a braking force to the wheel and tire assembly at the start of the braking event and the electrical power generated is stored wherein during the braking event the stored electrical energy is applied to the in wheel motor/generator by means of motorized braking described above.

In other embodiments, the wheel motor/generator functions as a brake by means of controlled dynamic braking wherein magnetic torque interactions between the rotor member and stator member sections apply a braking force to the wheel and tire assembly wherein the output terminals of electrical power generated is shorted wherein during the braking event the shorted electrical output energy is applied to the motor/generator by means of a controlled short wherein the duration of the short is precisely controlled and can be accomplished by use of IGBT's or IGCT's wherein the use of pulse width modulation (PWM) is applied thus allowing for controlled dynamic braking which differs from dynamic braking in that there is the capability to precisely control the braking force applied via computer controlled PWM control of the short duration and frequency of modulation used which is unique in the area of dynamic braking controls.

The various modes of braking and steering described above may be instituted at various times depending upon the vehicle dynamics at that particular point in time such as speed of operation, braking event, contact surface conditions or desired operational mode selected by the operator.

The wheel motor/generator, used to feed and extract energy can be of any type such as AC or DC induction, reluctance, permanent magnet type etc. The motor/generators that can be used can be categorized into three groups; Axial-Flux, Radial-Flux, and Halbach Array Machines.

In an embodiment, a wheel motor/generator consist of Radial-Flux Permanent Magnet Machines (RFPM) wherein the rotor consist of permanent magnets and is coupled to the wheel for rotation and the stator consist of conducting wire and is coupled to the axle for support that is static in relation to the wheel rotation wherein the wheel motor/generator functions as means of motion control for various vehicle maneuvers and braking control.

In another embodiment, a wheel motor/generator consist of Axial-Flux Permanent Magnet machines (AFPM) wherein axial flux permanent magnet members includes alternating rotor and stator members wherein each rotor member consist of permanent magnets and is coupled to the wheel for rotation and each stator member consist of conducting coils of wire that are associated with each permanent magnet within the rotor and is coupled to the axle for support that is static in relation to the tire rotation wherein the wheel motor/generator functions as means of motion control for various vehicle maneuvers and braking control.

There are numerous alternatives for the design of an AFPM machine such as internal rotor, internal stator, multi-member, slotted or slot-less stator, ironless stator or rotors with interior or surface-mounted magnets. Unlike radial machines, axial machines can have two working surfaces. Either two rotors combined with one stator or one rotor combined with two stators. The benefit of using a two surface working machine is the increase in power capacity and energy density. The axial flux machines have a few advantages over radial flux machines, such as a planar adjustable air gap, low external leakage of magnetic field for ironless stator configurations, easy of implementation of cooling arrangements.

Much attention has been directed towards optimizing radial gap machines. In a RFPM machine the magnets can be surface mounted on the rotor axle surrounded by the stator, or mounted in a ring enclosing the stator. The radial flux machine is used mostly in small-scale high-speed machines, where the tensile strength of the permanent magnets demands placing close to the rotating axle and in high heat situations such as within an aircraft jet engine.

Halbach arrays can be applied to both axial flux permanent magnet (AFPM) and radial flux permanent magnet (RFPM) motor/generator designs and linear motor designs. A Halbach array is a special arrangement of permanent magnets in which the magnetic flux lines add vectorally increasing the magnetic flux field on one side of the array while canceling vectorally the magnetic flux field to near zero on the other side. In the RFPM implementation Halbach-type magnet arrays can be constructed of 2n poles wherein n is any whole number and the permanent magnets are in a circular geometrical configuration or cylindrical Halbach array FIG. 6 that rotate and are arranged to produce a uniform flux distribution on the interior or exterior of the magnetic cylindrical drum or ring such that the increased levels of magnetic flux interacts with a set of stationary coils on the interior or exterior of the magnetic drum or ring such as to produce magnetic torque.

Figure 7:
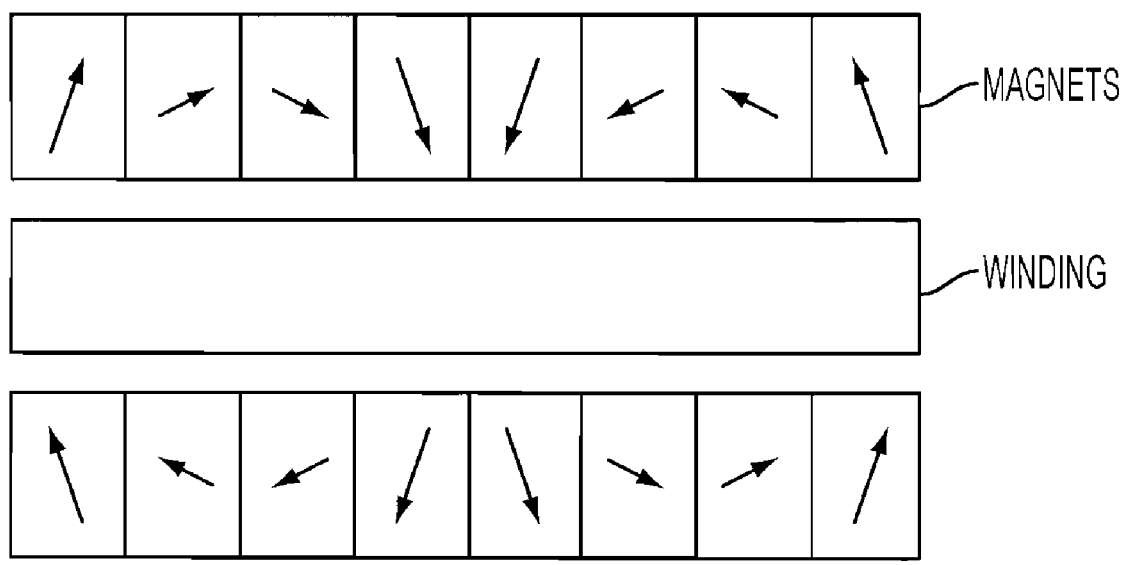
FIG. 7 shows an AFPM implementation of a Halbach-type magnet array that is constructed of 2 poles in accordance with one embodiment of the invention, wherein the permanent magnets rotate and are arranged to produce a uniform axial flux distribution on the interior or exterior of the magnets.

In the AFPM implementation Halbach-type magnet arrays can be constructed of 2n poles wherein n is any whole number and the permanent magnets rotate and are arranged to produce a uniform flux distribution on the interior or exterior of the magnetic member, as depicted in FIG. 7, such that the increased levels of magnetic flux interacts with a set of stationary coils on the interior or exterior of the magnetic member such as to produce magnetic torque.

The electric motor/generator may have mounted thereon a plurality of associated stator and rotor members which may be activated or deactivated individually, sequentially or in unison with the application of an electrical current or may be used in the generation of electrical current. Such currents flow in varying directions depending upon the need for motor and/or regenerative and/or motorized braking action. In one possible application electromagnetic braking is applied by using associated rotor and stator members as a generator and from which the output power from the stator is applied to another stator member in such a manner as to increase the braking effect of the associated rotor of said other stator member by causing motor action to be applied in the direction opposite to the rotational direction, thus accomplishing motorized braking action or motoring of a rotor or rotors within the same, or other wheel motor/generator as that of the generating rotor or rotors in a direction that is opposite to the rotational direction.

In an electrically powered vehicle or electrical vehicle (EV), all of the driving force is from the in wheel motor/generator and in an ironless in wheel motor/generator heat that is generated from conduction losses may be removed using an air or liquid cooling system wherein the removal of heat is from the stator section coils. The stator section coils are of a low inductance due to being ironless and as long as the heat generated from conduction losses can be removed there is no limit to the torque that can be produced. Practically if you double the torque you quadruple the heat generated due to conduction losses thus cooling and thermal mass become critical to the final design within said EV implementations. Such cooling is well known in the art and various methods may be employed to achieve proper cooling needs as in publication "Performance of Coreless-Winding Axial-Flux Permanent-Magnet Generator with Power Output at 400 Hz, 3000 r/min" IEEE TRANSACTIONS ON INDUSTRY APPLICATIONS, VOL. 34, NO. 6, NOVEMBER/DECEMBER 1998.

The method of motor/generator electrical interconnections of a different stator member or members within the same, or other wheel motor/generator, or motorized braking method as disclosed herein may be varied in numerous combinations of a generator member or members and a motor member or members within the disclosed apparatuses and methods. Furthermore, this is unique in the area of braking for motor/generators and offers flexibility in vehicle braking applications by allowing for the electrical and/or physical addition of a rotor stator member or members or removal of rotor stator member or members based upon the vehicle weight and/or vehicle design needs. This electrical interconnection of stator members in which any stator member within the wheel motor/generator rotor stator multi-member stack may act as a motor or as a generator or in any combination thereof is one form of the motorized braking method as proposed within the disclosed apparatuses and methods, which adds flexibility to the design of vehicles. Incorporating the use of rotor stator multi-member type motor/generators greatly reduces design cost due to this flexibility in motoring and braking of said motor/generator.

A concern in vehicle brake design is the dissipation of kinetic energy of said vehicle within the braking system of the vehicle during hard braking or emergency braking conditions; ultimately, it is the rolling friction present between the tires and the contact surface which slows the vehicle, and thus brake capacity requirements are based upon maximum weight of the vehicle and the rolling friction which are accurately determined within the intelligent motion control systems.

The method of motorized braking in accordance with the disclosed apparatuses and methods introduces flexibility in generating the required braking force that is lacking in the present state of the art friction based braking systems that experience fade or loss of braking power due to over heating, and allows for more efficient designs wherein an overloaded vehicle in a steep grade can increase the amount of braking capacity by means of altering the electrical connections through switching controls thus increasing the safety of the vehicle.

Furthermore, by implementing the use of electric in wheel motor/generators within the wheel or axel structure, the vehicle is able to reduce the turn radius in which a turn may be accomplished increasing the maneuverability of the vehicle.

In turning control an important element is slip angle which is the angle between a rolling wheels actual vector direction of travel and the desired vector direction that the wheel is pointing wherein the angle is defined as the vector summation of wheel translational velocity (v) and sideslip velocity (u) as determined by the current direction of the vehicle and the input from an operator's steering wheel. The slip angle results in a force (cornering force) perpendicular to the wheel's direction of travel. Due to the forces exerted on the wheels by the shifting weight of the vehicle during turning and braking the vehicle weight is not distributed evenly thus altering the contact patch geometry of the tire such that the slip angles of each wheel will be a different value which can be determined in real time allowing for dynamic adhesion coefficient values to be implemented thus providing for optimum control capability to a vehicle. The steering articulation angle, and rate of change of the steering articulation angle are generated from operator input of the steering wheel position and is used for input to the steering control system, which is steer by wire or wireless system.

The amount of torque required to achieve a particular slip angle at each wheel can be measured and used to precisely define the adhesion coefficient value of the tire and contact surface wherein the values are dynamically defined for each wheel in real time for use in the intelligent motion control systems such as vehicle control systems that drive and brake each wheel and steering motor positioning.

Reference will now be made to certain embodiments of the invention as depicted in the accompanying figures. FIG. 1 shows a possible axial type wheel hub impeller clamp used to accomplish the needed fluid flow for the drive system. The blade pitch may be varied from the root to the tip due to the differing blade linear velocity across the span of the blade at certain rotational velocities of the impeller.

Figure 2:
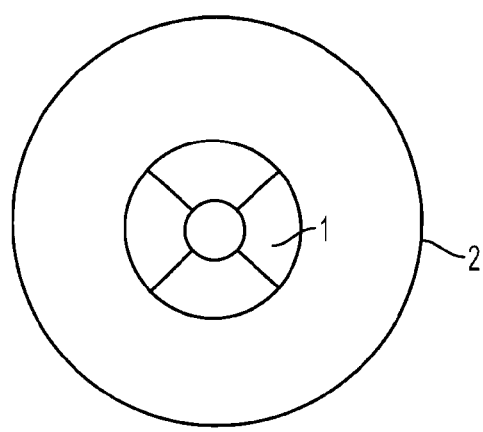
FIG. 2 shows the landing gear wheel in accordance with one embodiment of the invention, with a wheel hub impeller 1 and a tire 2.

In FIG. 2, the wheel hub impellers 1 are functionally coupled to the wheel and rotate with the wheel and associated tire 2.

Figure 3:
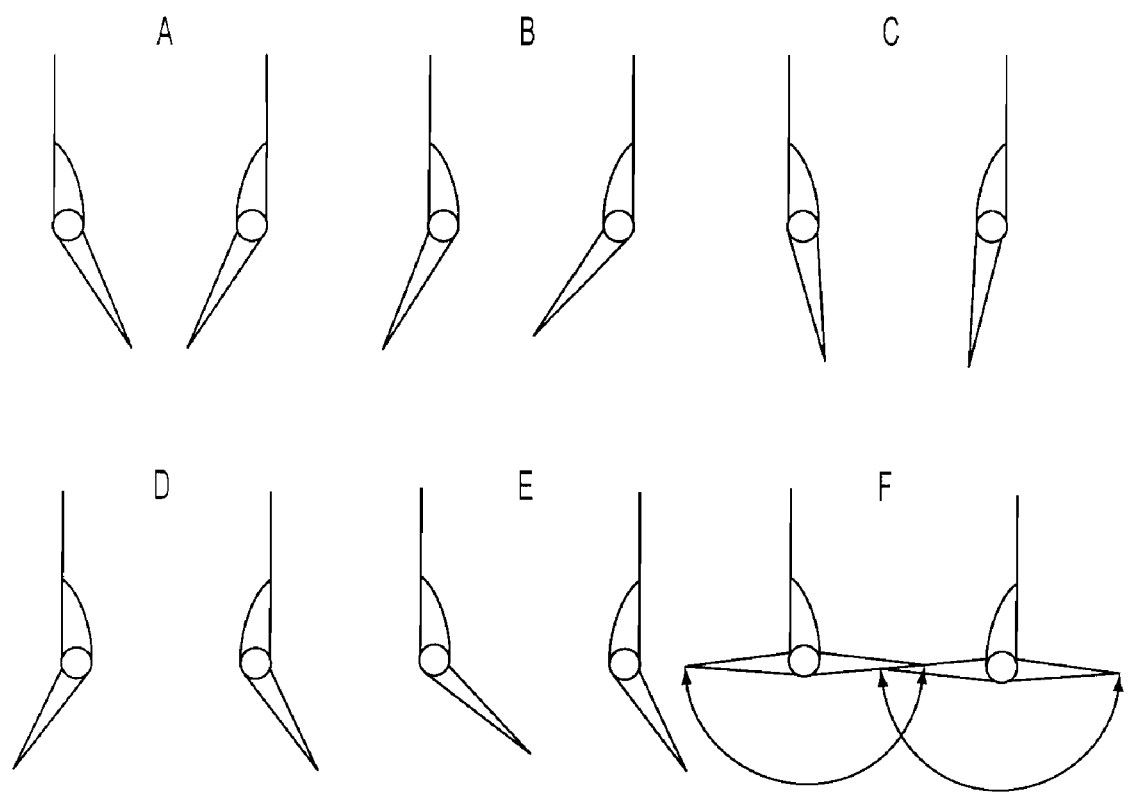
FIGS. 3 (A)-(F) show adaptable nozzle positions in accordance with certain embodiments of the invention.

FIGS. 3 (A) & (D) represent adaptable nozzle positions for optimizing propulsive force, wherein the outlet nozzle sizing is determined through testing to determine the maximum efficiency and/or thrust for a particular measured fluid flow rate for a particular fluid density (fresh, salt or brine at a particular temperature) as related to the applied input electrical power that is driving the impeller. FIGS. 3 (B) & (E) represent adaptable nozzle positions for the application of vectored thrust for steering, wherein the outlet nozzle sizing and positioning is determined through testing to determine the maximum efficiency and/or thrust for a particular measured fluid flow rate for a particular fluid density (fresh, salt or brine) as related to the applied input electrical power that is driving the impeller combined with actual and desired heading wherein there are many possible various combinations of the positioning of the adaptable nozzles that relate to the level of thrust and steering; thus, providing for precision maneuverability at peak efficiency. Possible nozzle configurations would include combining several nozzles together, which could be operated together or individually.

Figure 4:
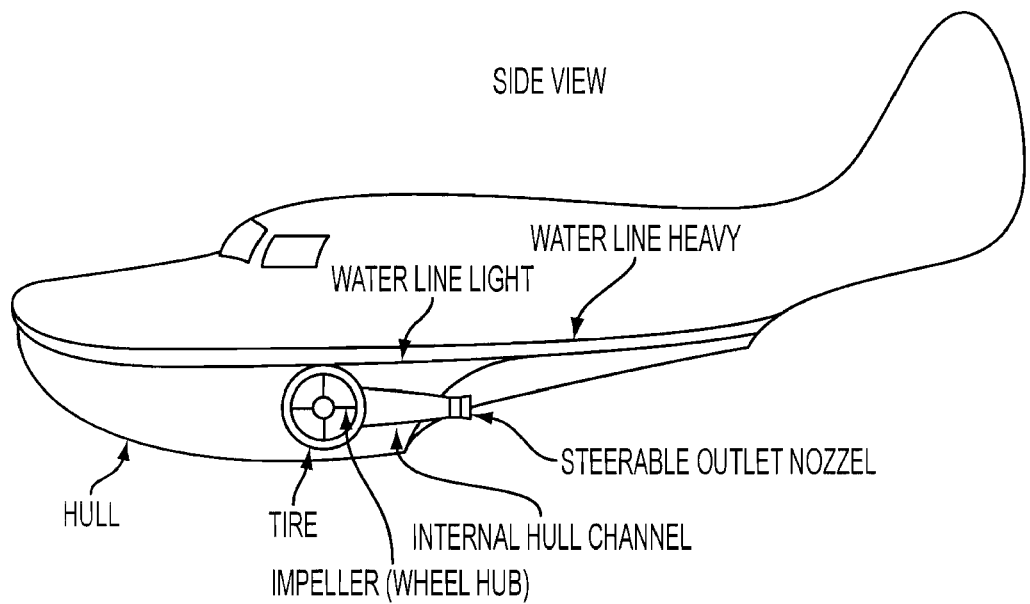
FIG. 4 shows a side view of an example of an amphibious aircraft in accordance with one embodiment of the invention, wherein the wheel hub impeller is shown below the water line. Furthermore, the figure also shows an example of the internal channel within the hull structure and the adaptive outlet nozzle that are further detailed within FIG. 3. The outlet nozzles may be below or above the water line.

FIG. 4 is a side view of an embodiment of the invention as applied to an amphibious aircraft, wherein the wheel hub impeller can be made to rotate in the forward or reverse direction allowing for fluid flow into or out of said impeller.

Figure 5:
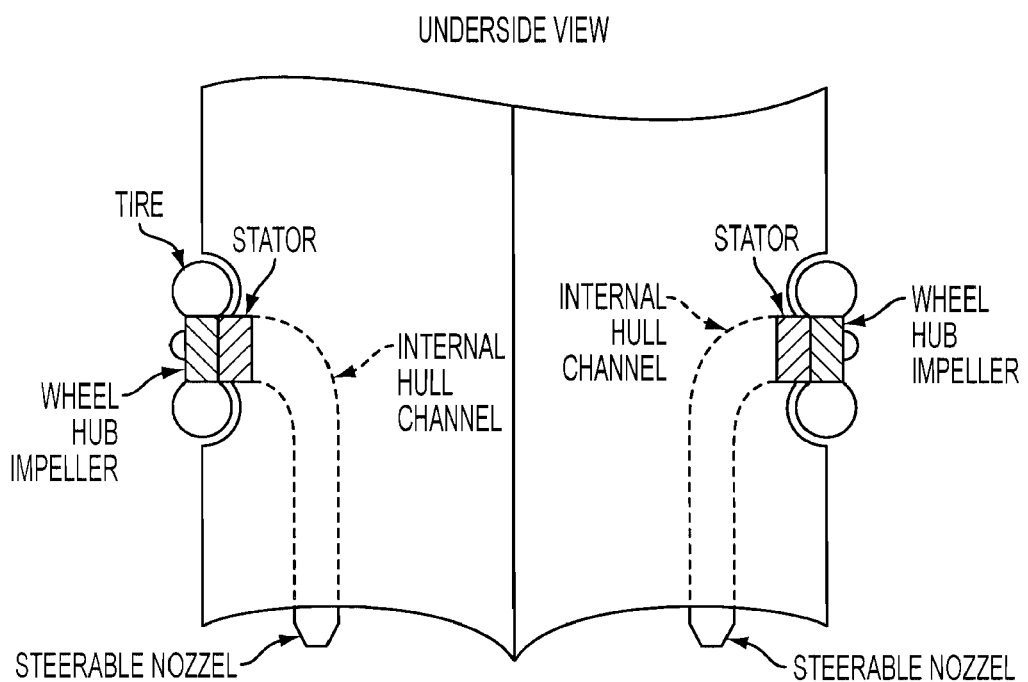
FIG. 5 shows an underside view of an amphibious aircraft in accordance with one embodiment of the invention, wherein the wheel hub impeller is shown along with the associated stator that removes most of the rotational flow of the fluid.
Figure 8:
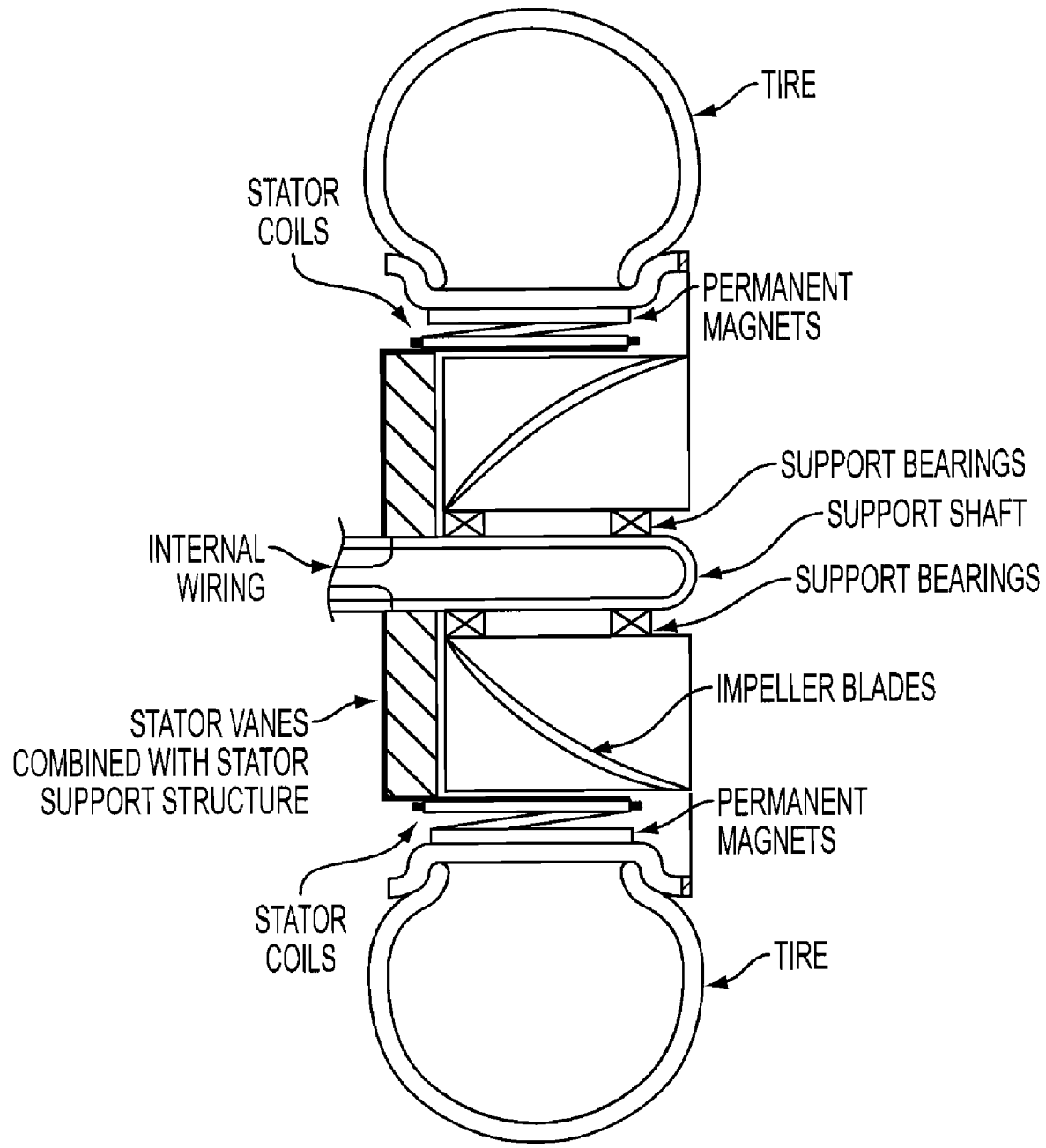
FIG. 8 shows an electric in wheel motor/generator structure combined with a wheel hub impeller in accordance with one embodiment of the invention, wherein the bearing support is operably coupled to a support shaft.

FIG. 5 is an underside view of the amphibious aircraft showing and alternate stator configuration than that shown in FIG. 8 which is part of the internal hull channel and may use vectored thrust by varying the output thrust from the two jet drives as opposed to or in addition to the vectored thrust of the adaptable (adjustable steerable) outlet nozzles.

Figure 6:
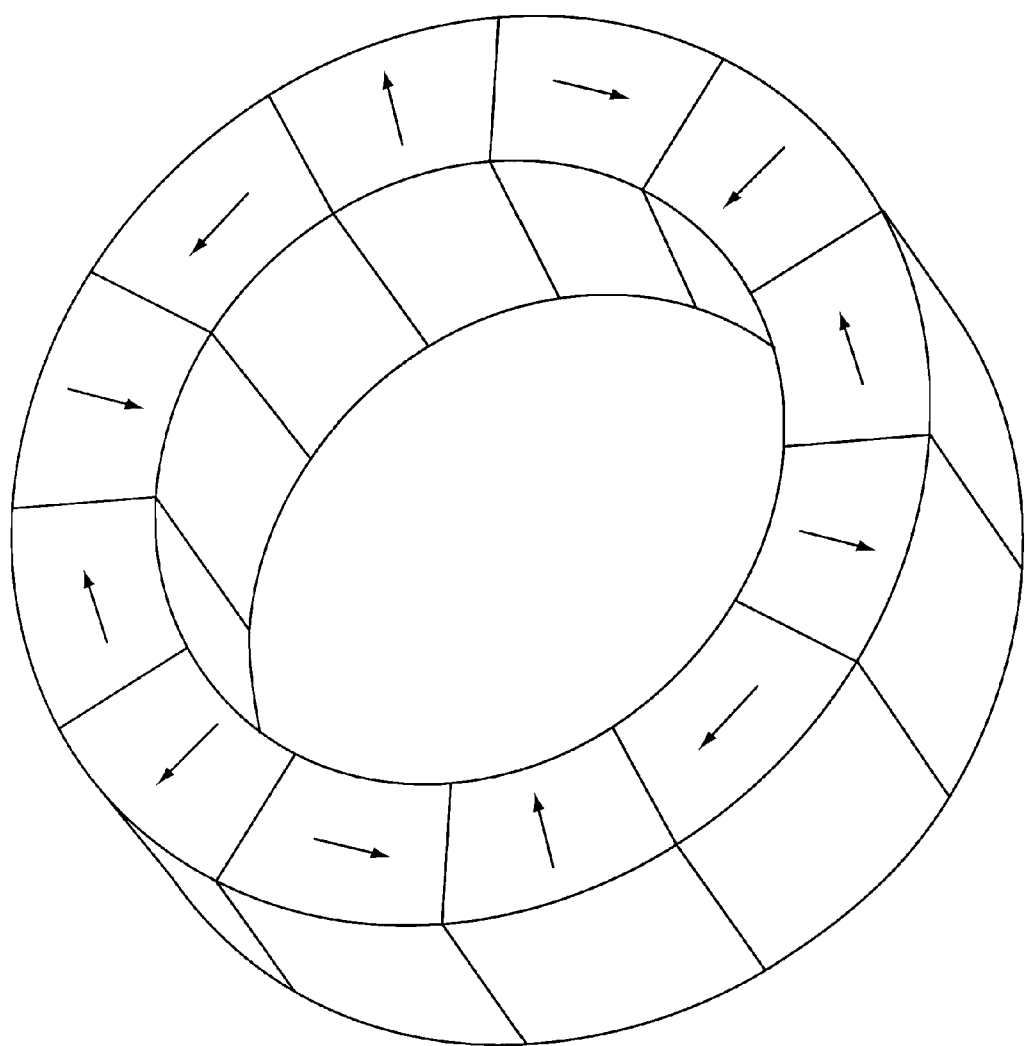
FIG. 6 shows a RFPM implementation of a Halbach-type magnet array that is constructed of 2 poles in accordance with one embodiment of the invention, wherein the permanent magnets are in a circular geometrical configuration or cylindrical Halbach array.

FIG. 6 represents a possible RFPM implementation of a Halbach-type magnet array that is constructed of two (2) poles, wherein the permanent magnets are in a circular geometrical configuration or cylindrical Halbach array to increase the magnetic flux density to further increase energy density of the motor/generator.

FIG. 7 represents an AFPM implementation of a Halbach-type magnet array that constructed of two (2) poles and the permanent magnets rotate and are arranged to produce a uniform axial flux distribution on the interior or exterior of the magnetic member to increase the magnetic flux density to further increase energy density of the motor/generator.

FIG. 8 is an example of a radial flux permanent magnet motor/generator. The stator section incorporates stator coils 4 that are sealed and are electrically isolated from each other except through available electrical connections (not shown) to the internal wiring 5. For some embodiments, the stator vanes 11 are part of said stator section or member 2, are coupled to the support shaft 3, and are stationary with respect to the wheel. The rotor member incorporates impeller blades 10 and permanent magnets 7 that are coupled to the wheel 6 with an associated tire 9. The wheel 6 is supported by means of support bearings 8, which may be comprised of inboard and outboard bearing sets or a sleeve, air, or magnetic type bearing. The possible bearing support structure could be bearings at the periphery or rim mounted bearings alone or in combination with the support bearings 8, wherein bearing support provides for bearing assemblies configured and positioned for support and to carry the radial and thrust reactionary loads applied to the impeller or wheel. Peripheral support alone would allow for the shaft to removed and improve fluid flow and reduce drag for higher performance of the impeller structure and in the case of a wheel allow for a hubless wheel structure.

Figure 9:
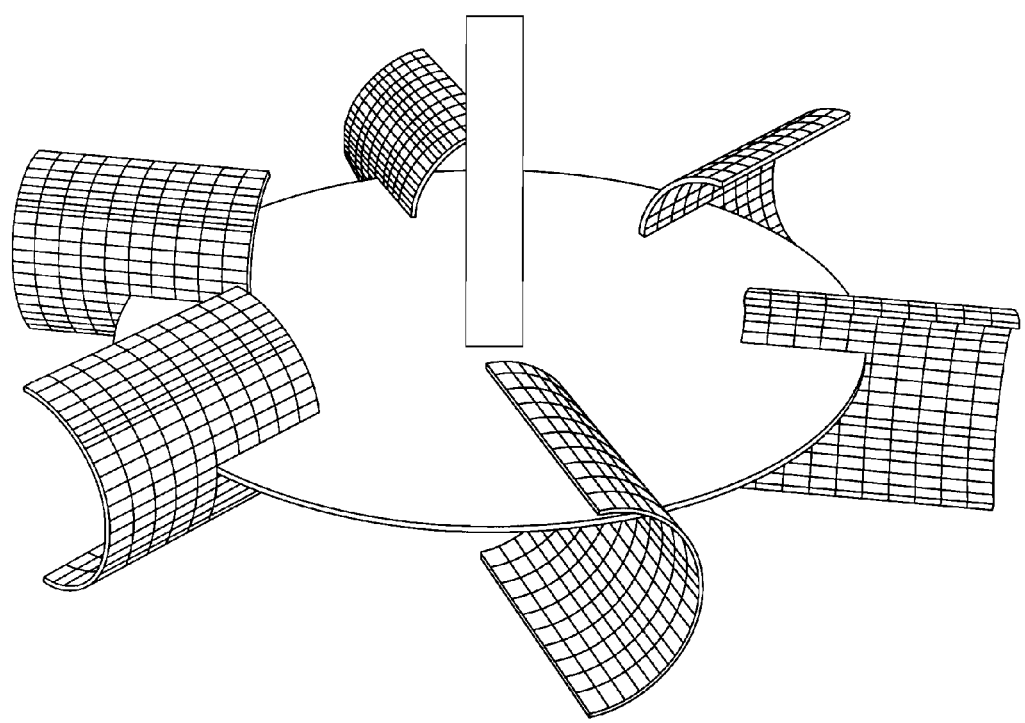
FIG. 9 shows another wheel hub impeller of many possible impellers, in accordance with one embodiment of the invention, that can be incorporated into the wheel hub of the amphibious vehicle for the purpose of converting electric power into fluid flow or relative fluid flow into electrical power.

FIG. 9 is another possible wheel hub impeller that would be used to cause radial fluid flow as opposed to axial fluid flow of the impeller of FIG. 1 wherein the wheel hub of FIG. 9 would be partially underwater so as to interact with the fluid such as to cause motive force to be applied by the rotating wheel to the amphibious vehicle.

For some embodiments, as depicted in FIG. 8, providing motor action to the wheel motor/generator Hall effect sensors are used to indicate the position of the permanent magnets wherein the magnets are alternating north and south poles with the flux aligned radial. The position information of the rotor member is sent to the processor for proper timing of control signals which are sent to the optical isolators and then sent to the polyphase brushless commutation driver control which applies power from the power storage device and/or onboard power supply to the stator field coils 4 that may be constructed of a Litz wire construction within stator member 2 such that a motor action is produced either in the forward or reverse directions dependent upon the input from the user input control which provides information to the processor through the optical isolators such as to initiate user input for forward or reverse motor action within the wheel motor/generator.

In some embodiments, as shown in FIG. 8, in providing generator action from the wheel hub motor/generator, an electrical power connection is provided for from the stator field coils 4 within a single stator member 2 to the regenerative braking and polyphase rectification control. As the relative motion occurs between the stator and rotor sections, a polyphase power signal is generated within the wheel hub motor/generator stator coils 4. This power signal is sent to the regenerative braking and polyphase rectification control, which converts the varying polyphase power signal into a DC signal based upon control signals generated from the processor, which is dependent upon the input user control signals from the user input control. If the processor control signal is such that power storage and/or power dissipation is required, then the DC power signal is sent from the regenerative braking and polyphase control to: the power storage device; and/or onboard power supply for later use; and/or sent to a power dissipation resistor for the dissipation of the generated electrical power. The regenerative braking and polyphase rectification control may also be used to provide polyphase electrical power to the motorized braking control, which is controlled by processor control signals in applying motorized braking commands as described within the preferred embodiment wherein polyphase power signals are applied to stator field coils 4 of wheel hub motor/generator; thus, increasing the braking effect by motoring the wheel 6 in the opposite direction to that of the rotor rotational direction, and consequentially providing for a motorized braking effect.

Brushless axial flux motors and generators are well known in which the use of segmented rotor and stator sections are used. Variations of brushless axial flux motors and generators are taught within the following U.S. Pat. Nos. 4,223,255; 4,567,391; 4,585,085; 6,046,518; 6,064,135; 6,323,573; 6,617,748; and 6,633,106, and also within the following application publications: US 2003/0159866 and US 2002/0171324. Any radial or axial flux type motor/generator may be used incorporating the methods as described within the patents including those that have yet to be issued patents. The rotors or stators are generally composed of permanent magnet segments such that there exist alternating north and south poles with the flux aligned radially or axially. The rotor or stator sections generally consists of stator or rotor coils within a single stator or rotor member attached to the stator or rotor member with hall effect sensors which are also attached to the stator or rotor member, which is also segmented as such to align the coil sets with that of the permanent magnets used within the rotor or stator. The stator or rotor coils within a single member require controlled application of currents to said coils from a polyphase brushless commutation driver control such as to cause motor action. The control signals applied to such polyphase brushless commutation driver controls are generated from a processor through optical isolation using position information provided for by the Hall effect sensors. Such brushless motors may also be used in regenerative braking to supply electrical current by means of generator action and the electrical current path is provided for by means of electrical switching controls wherein the electrical power generated is stored for later use via a control system.

The possible forms of radial or axial flux motors and/or generators may be summarized as disclosed in detail herein. Generally, the windings may be stationary or rotary. The windings may be incorporated into the following structures. In some embodiments, the structure is a slotted laminated or composite iron core material with the windings located within slots. In certain embodiments, the structure is a slotless structure in which the windings are wound into coils that may be embedded within an ironless structure or may be wound around a laminated or composite iron core material. Embodiments may include a structure that is a solid structure in which induced currents circulate within a solid conducting material, which may or may not be a ferromagnetic material. Windings for a member structure may be of printed circuit type and/or stamped from copper sheet. Windings may also be of copper windings wound into individual coils, which may or may not be of a litz wire construction.

Uses

In some embodiments of amphibious aircraft applications, the instant after touch-down on a runway, the in wheel motor/generator, which is used as a motor, may be converted so as to be used as a generator by discontinuing the application of power to the stator coils 4 and drawing power from said stator coils 4. This is due to the generator action that takes place when the magnetic field of the rotor member permanent magnets is in relative motion with that of the stator member coils. Such relative motion is due to the kinetic energy of the aircraft and by using well-known electrical switching action and controls. These may be electronically controlled switches, such as IGBT's or IGCT's and/or electromechanical type relays. Generated electrical power may be stored and/or dissipated and/or applied to another stator coil 4, which increases the braking effect by means of motorized braking.

In some embodiments, as shown in FIG. 8, the generated electrical current from the stator coil 4 may be stored on the onboard craft by means of ultracapacitors or nano-capacitor banks or other suitable electrical power storage devices, such as a gyro and/or a superconducting toroidal coil or coils that are electrically coupled to the stator coils 4 through the implementation of control electronics and/or physical contacts; thus, allowing for dissipation and/or storage of electrical power generated for the purpose of supplying electrical power for later use.

For some embodiments, as in FIG. 8, electromagnetic braking in its motorized braking method uses stored and/or onboard generated and/or external electrical power. Power may be applied to the stator coils 4 through provided electrical connections to internal wiring 5 such that motor action is applied to the rotor members opposing the rotational direction of the wheel; thus, accomplishing motorized braking or motoring of the wheel motor/generator. This then produces a motor action which is in direct opposition to the rotational direction of the wheel, and which generates a motorized braking action that exceeds that of regenerative braking alone; thus, decreasing the braking distance and increasing the safety of the amphibious aircraft or other marine vessels.

Another embodiment uses eddy current braking as opposed to electromagnetic braking wherein the rotor member are constructed of aluminum, aluminum alloy, steel, copper, beryllium, silver or any combination thereof of various constructions and the stator member may be constructed as described above in the electromagnetic case of the previous embodiment wherein the braking is accomplished by applying electrical current to the stator member such that the magnetic field of the stator member induces eddy currents within said rotor member such that there is developed a magnetic torque which generates a braking action upon the wheel of said vehicle.

Any combination of the above embodiments may be used.

In the case of a landing event, the pilot deploys the landing gear and the landing gear wheel motor/generator is applied power by the pilot input controls such as to cause a forward rotation of the landing gear tires. The rotational velocity of a landing gear tire would be caused to match the tire radial velocity and amphibious aircraft velocity; thus, greatly reducing the sliding friction wear of said tires at touchdown. The instant after touchdown, the control systems are used to store the generated electrical power from the wheel motor/generator; thus, providing regenerative braking. Then a few moments later, the stored energy can be applied to the wheel motor/generators via the control system to cause motor action in the opposite direction than that of the rotational direction of the rotor thus providing for motorized braking wherein such motorized braking can be used in charge-discharge cycle over and over again; thus, reducing the weight of the required energy storage system to cause the aircraft to come to a complete stop.

When landing on water, similar operations would apply, wherein the interacting fluid or water would be applying a braking force by causing generator action of the associated impeller for amphibious or marine craft.

In the case of a takeoff event, the pilot would initiate input controls such as to cause a forward rotation of the landing gear tires and power up the engines. This would cause the amphibious aircraft to travel down the runway or within the water faster than with the use of the aircraft engines alone; thus, reducing the needed distance for takeoff or increased payload capacity for a particular amphibious aircraft, and/or reducing the amount of fuel burn for takeoff.

Water jets are manufactured using a variety of structural alloy metals or other materials. Such materials may include, but are not limited to, copper, nickel, aluminum, bronze, stainless steel, titanium, carbides, and complex alloys of said metals. Such materials may also include composites and hybrid composites with reinforcement materials such as E, S or R-glass, carbon and carbon fiber and nanofibers that can be combined and woven in two and/or three dimensional woven materials. These may be further molded into matrix resins such as polyester, vinyl ester, phenolic, epoxy polymers and/or monomers or Ultra-High Molecular Weight Polyethylene (UHMWPE), polyethylene-polyethylene oxide blends with metal catalyst and plasticizer to match the wide variety of operating environments and design parameters in which they are used.

Composites that use Teflon, carbon, carbon fiber, nanofiber, glass or Aramid fiber may be used for the structural materials and composite hybrids that are made by the addition of some complementary material such as, graphene, fiberglass and/or Kevlar to the carbon fiber/epoxy matrix such as S-glass/Kevlar/carbon. The added materials are used to obtain specific material characteristics such as greater fracture toughness and impact resistance considered for areas subject to possible foreign object damage. The addition of graphene, carbon/epoxy to composite and hybrid composite structures is used to provide additional stiffness also carbon-carbon matrix structures can also be used.

The above materials can be combined within various combinations to achieve various material objectives such as hardness and toughness as needed.

Jet drive pump designs vary to meet the jet drive application and include single and multistage axial flow and mixed flow designs wherein the impellers may rotate separately in the same and/or opposite directions based upon the direction of the applied torque.

Jet drives steer the boat with vectored thrust, providing unmatched maneuverability, including the ability to precisely hold a boat in a fixed position against the effects of current and wind and provides for efficient astern thrust and instantly available reverse thrust for rapid braking at any speed.

Special provisions are incorporated within jet drives intended for use in very shallow water such as rivers, where ingestion of foreign debris such as sand and gravel is a common occurrence wherein such provisions include various means for clearing foreign debris that may obstruct the inlet or clog the pump; these include using reverse to run the pump backwards to blow the inlet clear and other aids include moveable rakes and readily accessed cleanout ports.

The development of electronic thrust controls allows for the drive systems to operate by coordinating the movement of the outlet nozzles, the size of the outlet nozzles and the precise application of positive and/or negative torque to the impellers (port and/or starboard) to provide increased thrust, efficiency and maneuverability.

It may be an object of certain embodiments of the invention to provide an improved system and method for marine drive control systems for amphibious and marine vehicles that include, electric in wheel motor/generators or motor/generators combined with impellers, wherein the control system knows at all times the applied positive or negative torque at each impeller wherein, for example knowledge of the physics of the vehicle and state dynamics enable computer controls to make accurate and fast adjustments to adjustable outlet nozzles size and/or direction to suit every circumstance of propulsion needs when in the water, and to make these adjustments very fast assisting the vehicle operator increasing maneuverability and safety of vehicle control systems for the operator.

It may also be an object of the disclosed apparatuses and methods to precisely control the deceleration and/or acceleration rate for each individual impeller using computer controls, which may incorporate the use of emergency protection by automatically taking action faster than the vehicle operator, could otherwise.

It may yet be another object to provide a system and method for recovering kinetic energy from an amphibious vehicle or marine vessel and convert such energy into electrical power that is stored for later use.

Further, it may be another object to provide an intelligent control system and method for a vehicle, which incorporates the use of electronic signal and electrical power controllers, software, accelerometers, Global Positioning System (GPS) and/or Differential GPS through techniques referred to as carrier phase differential processing using three sensing approaches selected were magnetometer, carrier phase differential GPS (CPDGPS), and inertial measurements using thermal accelerometers or other MEMS accelerometers combined with gyros for x, y and z axis, pressure transducers, actuators, communication systems and buses, speed sensors and electric in wheel motor/generators or motor/generators that permits increased levels of accuracy, precision, maneuverability, safety and control wherein such control can incorporated in the use of drive by wire or drive by wireless systems wherein the use of tactile force feedback is such as to provide for operator realism of operation and providing for stability and the ability to accurately reflect the status of the vehicle due to static and dynamic forces acting upon the vehicle by combining the magnetometer, CPDGPS, and inertial measurements within an inertial navigation system (INS) to calculate the full vehicle state with a high level of positional and control systems accuracy wherein the use of such measurements introduces a new relationship between applied torque, fluid flow dynamics and makes the outlet nozzle sizing calculations and when conditions change notify the vehicle operator of change in fluid flow condition or notify the operator of the current state of the fluid flow if so desired by the vehicle operator wherein such information is also made available to automatic control systems that might be incorporated within an amphibious vehicles or marine vessels.

Another objective for some embodiments may be to reduce the wear of an amphibious vehicle's tires due to sliding friction wear which is present in the current state of the art intelligent motion control of amphibious vehicles when in ground use due to excessive wheel acceleration rates, deceleration rates and skid-steering wherein such sliding friction is significantly reduced within the disclosed apparatuses and methods, which affects tire performance and wear rate thus affecting vehicle safety.

A further object may be to provide a means of motive force for the purpose of motoring the amphibious vehicle and assist in active safety system maneuvers of said vehicle, which contributes to increased, maneuverability, stability and safety of said vehicle wherein control can be initiated from the operator or by the control computer or in a computer assisted manner of operator control input.

Another object may be to provide a means of motive force for the purpose of assisting in yaw stability control wherein there is steering modes that can be used and consist of maneuvering control which incorporates magnetometer, CPDGPS, and inertial measurements within an inertial navigation system (INS) to calculate the full vehicle state with a high level of positional and control systems accuracy wherein the use of such measurements introduces a new relationship between applied torque, heading, velocity, and fluid flow dynamics and makes the outlet nozzle sizing calculations and required changes in nozzle sizing and contributes to increased thrust, maneuverability, stability and safety of said amphibious vehicles or marine vessels.

According to one aspect of the presently disclosed apparatuses and methods, there is provided a jet propulsion arrangement, including a jet propulsion unit having an inlet for fluid flow an outlet through which a fluid is discharged, a fluid flow path to direct said fluid flow between said inlet and said outlet and an impeller or impellers disposed within said fluid flow path to impart energy into said fluid, a fluid flow defining channel which accommodates an electrically driven impeller arrangement wherein said impeller arrangement is comprised of an electric motor/generator for the electrically driven rotor section, which is operably coupled to said impeller wherein the motor/generator is comprised of at least one rotor and at least one stator such that a gap exist between said rotor and stator members wherein said rotor member is operably coupled to the impeller for rotation and said stator member is operably coupled to the axle or torque tube and/or fluid flow channel for support.

According to another aspect of the disclosed apparatuses and methods, there is provided an amphibious jet propulsion arrangement or a marine jet propulsion arrangement having an inlet for fluid flow, adaptive (variable and steerable) outlet nozzles through which fluid discharge is controlled as to direction and as to size for the purpose of maximizing at least one of, thrust and efficiency based upon measured true input power, a fluid flow path to direct said fluid flow between said inlet and said outlet and at least one impeller disposed within fluid flow path to impart energy into said fluid from an electrical power source provided to the in wheel electric motor/generator or motor/generator wherein said impeller is operably coupled to said in wheel electric motor/generator or motor/generator of a wheeled amphibious craft or marine vessel wherein the wheel hub of said in wheel electric motor/generator includes an impeller structure and the motor/generator includes an impeller structure and the stator vanes are operably coupled to the stator of said in wheel electric motor/generator or motor/generator, a fluid flow defining channel which accommodates said in wheel electric motor/generator or motor/generator with a wheel hub impeller arrangement.

Certain embodiments of the present invention are distinguished in one aspect from the prior art by the integration of a wheel hub impeller arrangement within the housing of the electric in wheel motor/generator as part of the jet propulsion unit, as well as by the direct operable connection of the impeller unit to an electric motor/generator which lacks an associated wheel structure that is driven through the electrical power supplied to the stator coils wherein applied power is directly related to an optimum variable outlet nozzle size for a particular vehicle velocity at a particular thrust output power level. In this manner, the jet propulsion arrangement can be arranged or designed such that the installation of the jet propulsion arrangement is reduced in weight, simplified and provides for increased operational efficiency due to the control of the outlet nozzles sizing according to applied true power wherein simplification can be such that the jet propulsion arrangement can be installed with an electrical connection to a power source through a inverter-converter controller to the motor/generator. In amphibious wheeled vehicles and other amphibious craft the wheel mounting arrangement is operably coupled in a manner to the hull of the amphibious vehicle that creates advantages over prior art for amphibious vehicle use by simplification of the drive train means it is more easily balanced for smoother ride and a decrease in component count and failure rate.

A further significant advantage may be due to the lower cost of construction and maintenance by reducing the component count.

According to each aspect of the presently disclosed apparatuses and methods, the arrangement also can have a much more compact length, as well as a significant weight reduction due to the reduction in necessary drive shafts which not only eliminates the required prior art drive shafts, but also a significant number of associated bearings and seals.

Certain embodiments of the present invention use applied torque to each impeller or impellers (port and starboard) which is known precisely at any instant in time and related to fluid flow dynamics for the density of fluid used and allows for dynamic changes in the effective outlet nozzle size which can be varied compared to the applied torque, which directly relates to the thrust levels; thus, allowing for optimized outlet nozzle configurations for a particular vehicle velocity and heading for maximum thrust and increased maneuverability.

Although exemplary embodiments of this invention have been described, it in no way limits the scope within this invention. Those skilled in the art will readily appreciate that any modifications are possible and are to be included within the scope of this invention as defined in the following claims. In the claims, where means plus function clause are used, they are intended to cover the structural concepts described herein as performing the recited function and not only structural equivalents but also equivalent structures.

The disclosed apparatuses and methods of the present invention as described herein above in the context of the preferred embodiments is not to be taken as limited to all of the provided details thereof, since modifications and variations thereof may be made without departing from the spirit and scope of the invention. For example, the principles of the invention in their broader aspects may be applied to other motive and/or braking systems for amphibious ground vehicles such as buses, trucks, heavy equipment, automobiles, and boats.

What is claimed is:

1. A marine propulsion system for wheeled amphibious craft having an in wheel electric motor/generator, comprising:
   a jet propulsion unit having:
      an inlet for fluid flow,
      adaptive outlet nozzles through which fluid discharge is controlled as to direction and as to size for the purpose of maximizing at least one of thrust and efficiency based upon measured true input power,
      a fluid flow path to direct said fluid flow between said inlet and said outlet nozzles, at least one impeller disposed within said fluid flow path to impart energy into said fluid flow from an electrical power source provided to the in wheel electric motor/generator, wherein said impeller is operably coupled to said in wheel electric motor/generator of said wheeled amphibious craft, wherein the wheel hub of said in wheel electric motor/generator is the impeller and stator vanes are operably coupled to a stator structure of said in wheel electric motor/generator, a fluid flow defining channel which accommodates said in wheel electric motor/generator with a wheel hub impeller arrangement, wherein said in wheel electric motor/generator is comprised of:
  at least one rotor section and at least one stator section arranged such that a gap exists between rotor and stator sections,
  wherein said rotor section is operably coupled to a wheel of said wheeled amphibious craft for rotation and said stator section is operably coupled to the amphibious craft for nonrotational support, the rotor section comprising a permanent magnet structure with an associated magnetic flux field and the stator section comprising current carrying conductors;
  wherein the wheel is operably coupled to the impeller and rotatable with respect to the stator section about a rotational axis;
  wherein the stator and rotor sections of said in wheel electric motor/generator are configured such that the interaction of their magnetic fluxes causes at least one of:
    (a) the conversion of electrical energy into rotational torque energy when electrical power is applied at input terminals of said current carrying conductors to create an associated magnetic flux field within the current carrying conductors that interacts with said rotor magnetic flux field thus applying magnetic torque to said rotor section, and
    (b) the conversion of rotational torque energy of said wheel into electrical energy when relative motion exists between the permanent magnet structure within the rotor section and the current carrying conductors within the stator section, generating electrical power at the terminals of said current carrying conductors to create an associated magnetic flux field within the current carrying conductors that interacts with said rotor section magnetic flux field, thus applying magnetic counter torque to said rotor section.

2. A propulsion system for wheeled amphibious craft having an in wheel electric motor/generator, comprising:
  a control system through which vehicle maneuvering is controlled as to direction and as to maximizing at least one of torque applied and efficiency,
  a torque controller to direct torque to each individual wheel from an electrical power source provided to the in wheel electric motor/generator,
  wherein each said wheel is operably coupled to said wheeled amphibious craft,
  wherein said in wheel electric motor/generator is comprised of:
    at least one rotor section and at least one stator section arranged such that a gap exists between said rotor and stator sections,
    wherein said rotor section is operably coupled to a wheel of said wheeled amphibious craft for rotation and said stator section is operably coupled to an an amphibious craft for nonrotational support, the rotor section comprising a permanent magnet structure with an associated magnetic flux field and the stator section comprising current carrying conductors; and said wheel is operably coupled to an impeller and rotatable with respect to the stator section about a rotational axis;
    wherein the stator and rotor sections of said in wheel electric motor/generator are configured such that the interaction of their magnetic fluxes causes at least one of:
      (a) the conversion of electrical energy into rotational torque energy when electrical power is applied at input terminals of said current carrying conductors to create an associated magnetic flux field within the current carrying conductors that interacts with said rotor section magnetic flux field, thus applying magnetic torque to said rotor section of said wheel, and
      (b) the conversion of rotational torque energy of said wheel into electrical energy when relative motion exists between the permanent magnet structure within the rotor section and the current carrying conductors within the stator section, generating electrical power at the terminals of said current carrying conductors to create an associated magnetic flux field within the current carrying conductors that interacts with said rotor section magnetic flux field, thus applying magnetic counter torque to said rotor section.

3. A marine propulsion system for water craft having an electric motor/generator, comprising:
  a jet propulsion unit having:
    an inlet for fluid flow,
    adaptive outlet nozzles through which fluid discharge is controlled as to direction and as to size for the purpose of maximizing at least one of thrust and efficiency based upon measured true input power,
    a fluid flow path to direct said fluid flow between said inlet and said outlet nozzles, and
    at least one impeller disposed within said fluid flow path to impart energy into said fluid from an electrical power source,
  wherein said impeller is operably coupled to said electric motor/generator and the stator vanes are operably coupled to a stator structure of said electric motor/generator,
  a fluid flow defining channel which accommodates said electric motor/generator impeller arrangement,
  wherein said electric motor/generator is comprised of:
    at least one rotor section and at least one stator section arranged such that a gap exists between said rotor and stator sections,
    wherein said rotor section is operably coupled to said impeller for rotation and said stator section is operably coupled to said fluid flow channel for nonrotational support, the rotor section comprising a permanent magnet structure with an associated magnetic flux field and the stator section comprising current carrying conductors;
    wherein the fluid flow defining channel is a fluid flow defining channel of a marine craft;
    wherein the rotor section is rotatable with respect to the stator section about a rotational axis;

wherein the stator and rotor sections of said electric motor/generator are configured such that the interaction of their magnetic fluxes causes at least one of:
(a) the conversion of electrical energy into rotational torque energy when electrical power is applied at input terminals of said current carrying conductors to create an associated magnetic flux field within the current carrying conductors that interacts with said rotor section magnetic flux field, thus applying magnetic torque to said rotor section of said impeller, and
(b) the conversion of rotational torque energy of said impeller into electrical energy when relative motion exists between the permanent magnet structure within the rotor section and the current carrying conductors within the stator section, generating electrical power at the terminals of said current carrying conductors to create an associated magnetic flux field within the current carrying conductors that interacts with said rotor section magnetic flux field, thus applying magnetic counter torque to said rotor section.

4. A marine propulsion system for wheeled amphibious craft having an in wheel electric motor/generator, comprising:
a radial wheel hub impeller propulsion unit that is partially submerged within a fluid to impart energy into said fluid and cause motive force to be applied by a rotating wheel to said amphibious craft, which is operably coupled to an in wheel electric motor/generator;
wherein said in wheel electric motor/generator is comprised of:
at least one rotor section and at least one stator section arranged such that a gap exists between said rotor and stator sections,
wherein said rotor section is operably coupled to a wheel of said wheeled amphibious craft for rotation and said stator section is operably coupled to the amphibious craft for nonrotational support, the rotor section comprising a permanent magnet structure with an associated magnetic flux field and the stator section comprising current carrying conductors;
wherein the wheel is operably coupled to an impeller and rotatable with respect to the stator section about a rotational axis;
wherein the stator and rotor sections of said in wheel electric motor/generator are configured such that the interaction of their magnetic fluxes causes at least one of:
(a) the conversion of electrical energy into rotational torque energy when electrical power is applied at input terminals of said current carrying conductors to create an associated magnetic flux field within the current carrying conductors that interacts with said rotor section magnetic flux field, thus applying magnetic torque to said rotor section of said wheel, and
(b) the conversion of rotational torque energy of said wheel into electrical energy when relative motion exists between the permanent magnet structure within the rotor section and the current carrying conductors within the stator section, generating electrical power at the terminals of said current carrying conductors to create an associated magnetic flux field within the current carrying conductors that interacts with said rotor section magnetic flux field, thus applying magnetic counter torque to said rotor section.

5. The system of claim 1, wherein: at least a portion of the propulsion unit is formed by at least one selected from the set of: copper, nickel, aluminum, bronze, stainless steel, titanium, carbides, complex alloys, composites, or hybrid composites with reinforcement materials.

6. The system of claim 1, wherein: said permanent magnet structure is segmented into alternating north and south poles interacting with said current carrying conductors that are constructed of coils and controlled by an electrical control system such that the stator coils are associated with an equal number of rotor poles and wherein the coils of the stator section are sized similarly to the associated permanent magnets segments within the rotor section.

7. The system of claim 1, wherein: said permanent magnet structure is constructed of homopolar magnets with a north/south pole interacting with said current carrying conductors, which is composed of electrically conductive material that is arranged to create at least one of motor action and generator action by interacting with said rotor section permanent magnet structure flux field, wherein the supplied electrical power is from an electrical power source through an electrical control system such that said electrically conductive material is supplied with direct current power and controlled as to power level, direction and duration via electrical connections and electrical control system to accomplish at least one of motor action and generator action.

8. The system of claim 6, wherein: said electrical control system is an inverter controlling the supplied multiple phase pulse width modulated voltage from a DC power source to said stator coils; said inverter having a controller for control of said inverter and applied active currents, wherein the controller detects rotor velocity based on rotor position and rate of change in position, the controller controlling a duty cycle of said multiple phase pulse width modulated voltage modulating the duty cycle, to minimize the difference between a target value of rotor velocity and the detected rotor velocity wherein said controller modifies said duty cycle of said controller to minimize said difference between the target rotor velocity value and actual rotor velocity.

9. The system in accordance with claim 8, further comprising: hall effect sensors within said stator section, the hall effect sensors sensing the direction of rotation, position and velocity of the rotor magnets in relationship with associated stator coil windings to time the application of currents to said stator coil windings and for tracking the applied active currents and to provide for velocity and directional information to said control system for the purpose of generating magnetic torque applications to produce motor action.

10. The system in accordance with claim 8, further comprising: a sensorless control system using voltage within the stator coils to determine the direction of rotation, position and velocity of the rotor magnets in relationship with associated stator coil windings to time the application of currents to said stator coil windings and to provide for positional, velocity and directional information to said control system for the purpose of generating magnetic torque applications to produce motor action.

11. The system in accordance with claims 9 or 10, wherein: the velocity of the rotor is targeted such that the rotational velocity of the associated wheel tire is made to closely match the relative ground speed of an associated aircraft, thus causing landing gear wheels of said aircraft to start out in a rolling friction state.

12. The system in accordance with claims 6 or 7, wherein: said stator and rotor sections comprise an axial flux design, wherein electrical connections to an electrical source are provided for via an electronic switching and control system such that each stator coil may generate an individual axial magnetic flux field to interact with the associated axial magnetic flux field of the permanent magnets within the rotor section to create motor action.

13. The system in accordance with claims 6 or 7, wherein: said stator and rotor section comprise a radial flux design, wherein electrical connections to an electrical energy source are provided for via an electronic switching and control system such that each tube conductor may generate an individual radial magnetic flux field to interact with the associated radial magnetic flux field of said permanent magnets within the rotor section to create motor action.

14. The system in accordance with claims 6 or 7, wherein: electrical power is applied to at least one stator section coil in such a manner as to apply a braking effect by motoring the associated rotor sections to oppose the rotor section's rotational direction.

15. The system in accordance with claim 6, wherein: the generated electrical power is supplied to an electrical power storage device through an electrical control system such that the stator coil windings supply a varying number of alternating current power levels with various electrical phases via electrical connections and the electrical control system to accomplish generator action.

16. The system in accordance with claim 7, wherein: the generated electrical power is supplied to an electrical power storage device through an electrical control system such that said electrically conductive material supplies direct current power controlled as to power level, direction and duration via electrical connections and the electrical control system to accomplish generator action.

17. The system in accordance with claims 6 or 7, wherein: the generated electrical output power is dissipated within an energy dissipation device through the control system such that the stator coil windings supply an output power signal that is applied to said energy dissipation device.

18. The system in accordance with claim 17, wherein: said energy dissipation device is configured for induction heating wherein heating of an object is accomplished by electromagnetic induction, where eddy currents are generated within the object of conductive material and the associated resistance leads to Joule heating of said object, wherein the induction heating consists of an altering electromagnetic flux field generated by an alternating current as it is passed through a coil and an associated object which has eddy currents introduced due to time rate of change of the electromagnetic flux field, thus generating heating of said associated object.

19. The system in accordance with claim 17, wherein: the energy dissipation device is comprised of at least one dissipation resistor for the purpose of converting the electrical power into heat energy.

20. The system in accordance with claim 19, wherein: said at least one dissipation resistor is composed of heat-generating material within a sealed thermal heat sink enclosure and a phase change material within said sealed thermal heat sink that is in thermal contact with said heat-generating material.

21. The system in accordance with claim 12, wherein: an Axial Flux Permanent Magnet (AFPM) implementation of a Halbach-type magnet array is constructed such that constructed poles and permanent magnets rotate and are arranged to produce a uniform axial flux distribution on the magnets to increase the magnetic flux density interacting with the current carrying conductors to further increase energy density of the motor/generator.

22. The system in accordance with claim 13, wherein: a Radial Flux Permanent Magnet (RFPM) implementation of a Halbach-type magnet array is constructed such that constructed poles of the permanent magnets are arranged to increase the magnetic flux density interacting with the current carrying conductors to further increase energy density of the motor/generator.

23. The system in accordance with claim 2, further comprising: an intelligent control system that comprises vehicle control systems that drive and brake each wheel independently, wherein the applied torque to the in wheel motor/generator is known and the control dynamics is fast to allow for intelligent motion controls of the vehicle, wherein each wheel with an in wheel motor/generator generates positive and negative torque values in various combinations to enhance vehicle steering control capability, a permanent magnet DC motor that is coupled to the steering column and is used with a steer by wire steering unit to provide steering control through a Pulse Width Modulated (PWM) interface and increase stability and control, wherein such steering control comprises steering that is initiated automatically, wherein such a steering control incorporates high speed and low speed steering modes, wherein the angular movement and positioning control of each wheel is achieved by means of an articulated moveable linkage that is electromagnetically actuated, and wherein the steering is assisted from differential motoring and braking of each wheel.

24. The system in accordance with claim 23, wherein: said intelligent control system contains at least one selected from the set of: conditions, actions, state items, monitoring interface, or filters.

25. The system in accordance with claim 24, further comprising: Traction Control Systems (TCS) applied to the in wheel hub motor/generators to be actively controlled by the motor controller with control dynamics, wherein said motor controller can be used to influence vehicle performance, wherein control of wheel traction influences motoring, braking, steering and cornering.

26. A marine propulsion system for wheeled amphibious craft, comprising:
an in-wheel motor/generator, comprising:
at least one rotor section and at least one stator section arranged such that a gap exists between rotor and stator sections; and
impeller blades operably connected to and rotatable with the rotor section;
wherein the stator section is configured for non-rotational coupling to an amphibious craft, the rotor section is configured for operable coupling to a wheel of the amphibious craft and for rotation with respect to the stator section, and the impeller blades are configured to form at least a part of a hub of the wheel;
wherein the rotor section comprises a permanent magnet structure and the stator section comprises current carrying conductors;
wherein the stator and rotor sections of the in wheel electric motor/generator are configured such that the interaction of their magnetic fluxes causes at least one of:
 (a) the conversion of electrical energy into rotational torque energy when electrical power is applied at input terminals of the current carrying conductors; and
 (b) the conversion of rotational torque energy of said wheel into electrical energy when relative motion exists between the permanent magnet structure and the current carrying conductors.

* * * * *